United States Patent [19]
Clough et al.

[11] Patent Number: 5,633,081
[45] Date of Patent: May 27, 1997

[54] COATED POROUS SUBSTRATES

[75] Inventors: Thomas J. Clough, Grover Beaach; Victor L. Grosvenor, Topanga; Naum Pinsky, Thousand Oaks, all of Calif.

[73] Assignee: Ensci Inc., Pismo Beach, Calif.

[21] Appl. No.: 345,232

[22] Filed: Nov. 25, 1994

Related U.S. Application Data

[63] Continuation-in-part of Ser. No. 874,178, Apr. 24, 1992, abandoned, and Ser. No. 293,699, Aug. 19, 1994, which is a division of Ser. No. 874,178, which is a continuation-in-part of Ser. No. 770,557, Oct. 3, 1991, abandoned, which is a continuation-in-part of Ser. No. 621,660, Dec. 3, 1990, Pat. No. 5,204,140, which is a continuation-in-part of Ser. No. 348,789, May 8, 1989, Pat. No. 5,167,820, Ser. No. 348,788, May 8, 1989, Pat. No. 5,039,845, Ser. No. 348,787, May 8, 1989, abandoned, and Ser. No. 348,786, May 8, 1989, Pat. No. 5,182,165, said Ser. No. 348,789, Ser. No. 348,788, Ser. No. 348,787, and Ser. No. 348,786, each is a continuation-in-part of Ser. No. 272,517, Nov. 17, 1988, abandoned, and Ser. No. 272,539, Nov. 17, 1988, abandoned, said Ser. No. 272,517, and Ser. No. 272,539, each is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.⁶ .................................................. B05D 1/40
[52] U.S. Cl. .................... 428/331; 428/337; 428/414; 428/425.9; 428/480; 428/483; 428/516; 428/520; 428/688
[58] Field of Search .................... 428/688, 331, 428/337, 425.9, 414, 480, 483, 516, 520

[56] References Cited

U.S. PATENT DOCUMENTS

| | | |
|---|---|---|
| 2,564,707 | 8/1951 | Mochel . |
| 3,004,875 | 10/1961 | Lytle . |
| 3,005,731 | 10/1961 | Payne . |
| 3,544,361 | 12/1970 | Servais . |
| 3,562,124 | 2/1971 | Leon . |
| 3,562,127 | 2/1971 | Wooton et al. . |
| 3,577,273 | 5/1971 | Soderberg . |
| 3,713,884 | 1/1973 | Maley . |
| 3,870,567 | 3/1975 | Palmer et al. . |
| 3,890,429 | 6/1975 | Pytlewski . |
| 3,932,694 | 1/1976 | Hamaguchi et al. . |
| 3,959,565 | 5/1976 | Jordan et al. . |
| 4,108,107 | 8/1978 | Scheuermann . |
| 4,229,491 | 10/1980 | Dislich et al. . |
| 4,240,882 | 12/1980 | Ang et al. . |
| 4,258,080 | 3/1981 | Sonada et al. . |

(List continued on next page.)

FOREIGN PATENT DOCUMENTS

| | | |
|---|---|---|
| 0116785 | 8/1984 | European Pat. Off. . |
| 0130875 | 9/1985 | European Pat. Off. . |
| 0172563 | 2/1986 | European Pat. Off. . |
| 863970 | 4/1941 | France . |
| 995222 | 11/1951 | France . |
| 2132440 | 11/1972 | France . |
| 5300987 | 7/1976 | Japan . |
| 1572333 | 7/1980 | United Kingdom . |

OTHER PUBLICATIONS

"Electroless Deposition of $SnO_2$ and Antimony Doped $SnO_2$ Films," D. Raviendra et al, J. Phys Chem Colids vol. 45 No. 8, pp. 945–950, 1985 USA.

"Sn(Sb)–Oxide Sol–Gel Coatings on Glass," C.J.R. Gonzaiez–Oliver et al, J Non–Crystalline Solids 82, pp. 400–410, 1986, Amsterdam.

"Physical Properties of Tin Oxide Films Deposited by Oxidation of $SnCl_2$," N.S. Murty et al, Thin Solid Films 92, pp. 347–354, 1982, The Netherlands.

(List continued on next page.)

Primary Examiner—P. C. Sluby
Attorney, Agent, or Firm—Frank K. J. Uxa

[57] ABSTRACT

A coated porous substrate comprising a porous substrate having a coating of electrically conductive tin oxide on at least a portion of all three dimensions thereof. The coated porous substrate is useful in the lead acid batteries, catalysis, heating, shielding porous membrane and field dependent fluid applications.

24 Claims, 1 Drawing Sheet

U.S. PATENT DOCUMENTS

| | | |
|---|---|---|
| 4,263,335 | 4/1981 | Wagner et al. |
| 4,297,420 | 10/1981 | Chenaux et al. |
| 4,326,017 | 4/1982 | Will |
| 4,336,282 | 6/1982 | Sato et al. |
| 4,349,369 | 9/1982 | Van Laethem et al. |
| 4,371,740 | 2/1983 | Clem |
| 4,451,542 | 5/1984 | Ishida et al. |
| 4,502,931 | 3/1985 | Asano et al. |
| 4,510,219 | 4/1985 | Rowlette |
| 4,535,315 | 8/1985 | Sakai |
| 4,539,268 | 9/1985 | Rowlette |
| 4,542,082 | 9/1985 | Rowlette |
| 4,547,443 | 10/1985 | Rowlette et al. |
| 4,606,941 | 8/1986 | Jenkin |
| 4,614,669 | 9/1986 | Yannopoulos |
| 4,664,935 | 5/1987 | Strahl |
| 4,681,777 | 7/1987 | Engelken et al. |
| 4,713,306 | 12/1987 | Clough et al. |
| 4,818,437 | 4/1989 | Wiley |
| 4,818,438 | 4/1989 | Wiley |

OTHER PUBLICATIONS

"Tin Dioxide Gas Sensors," Part 1, J.F. McAleer et al, J. Chem Soc. Faraday Trans I, 83, pp. 1323–1346, 1987.

"Tin Dioxide Gas Sensors," Part 2, J.F. McAleer et al, J. Chem Soc. Faraday Trans 1,83, pp. 441–457, 1988.

"Preparation of Thick Crystalline Films of Tin Oxide and Porous Glass Partially Filled with Tin Oxide," J Electrochem. Soc. 116, pp. 1025–1208.1.

"The Catalyzed Conversion of Methane at High Pressure" N. R. Hunter et al, Symp Hydrocarbon Oxidation, Amer Chem Soc, 1987.

"Compression Molding of Conductive Plastics," D. E. Davenport.

"A Review of Tin Oxide–Based Catalytic Systems: Preparation, Characterization and Catalytic Behavior",: G. B. Hoflund, NASA Conference Publication 2456, pp.179–192, 1987.

"Sol–Gel AR Films for Solar Applications," C.S. Ashley et al, work performed at Sandia National Laboratories.

"Sol–Gel Glass Research," Technology Forecasts and Technology Surveys, pp. 5–7, 1982.

"Tin Oxide Films on Glass Substrates by a Sol–Gel Technique," R. Puyane et al, pp. 190–197.

"High Selectivity of CVD $SnO_2/SiO_2$ Catalysts for Oxidative Dehydrogenation of Ethylbenzene," T. Hattori, et al, Prep of Catalysts IV,pp. 113–123, 1987.

Chemical Abstracts: 108:226223K; 108:22244v; 108:106808b; 108:187304r; 108:186329r; 108:170586m; 108:134682f; 108:130823e: 108:118199y; 108:101743y; 108:943990a; 108:81016h;.

Partial abstract Sharp Corp.; 108:61718k; 108:55553m; 108:15544c; 108:6746u; 108:243657b; 107:243656a; 107:243657b; 107:243559w; 107:24356; 107:219831h; 107:219602j; 107:186083k; 107:182422x.

Dietz H. et al "The effect of Additives on The Positive Lead Acid Battery Electrode" Journal of Power Source 14 (1985) 305–319.

Baker S.U. et al "The Role of Additives In The Positive Active Mass of the Lead/Acid Cell" Journal of Power Sources, 27 (1989) 124–143.

Edwards D.B. "Evaluation of Hollow, Glass Microspheres Used as an Additive in Positive Lead Acid Battery Pasta", Journal of Power Sources, 34 (1991) 217–232.

Tokunagu A. et al "Effect of Anisotropic Graphite on Discharge Performance of Positive in a Plates in Pasted–Typed Lead–Acid Battery" L. Electrochem. Soc. (Mar. 1987) vol. 134 No. 3 pp. 525–529.

Tokunaga A. et al "Application of Arisotrophic Graphite To Sealed Lead Acid Batteries" J. Electrochem. Soc. vol. 136, No. 1 Jan. 1989 pp. 33–36.

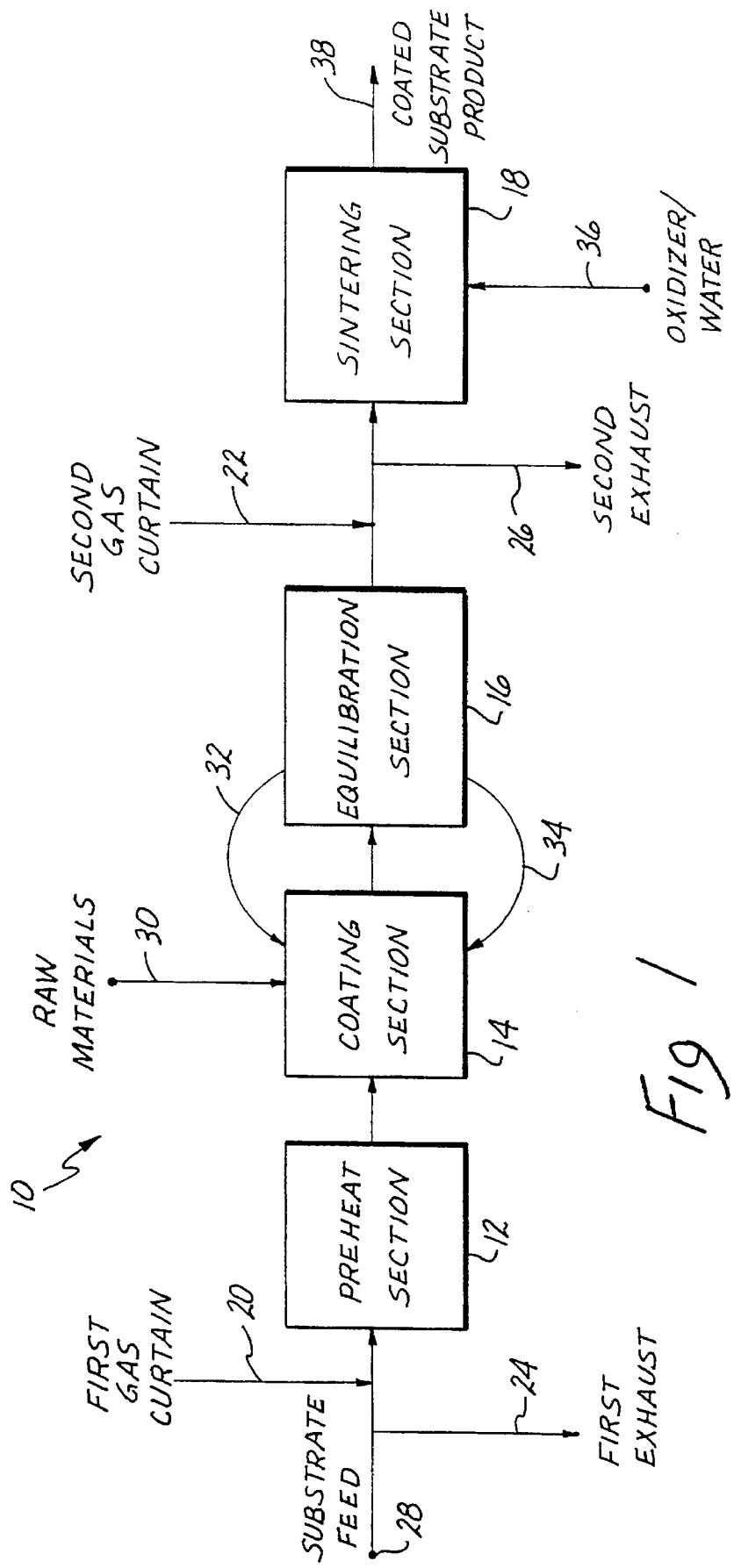

COATED POROUS SUBSTRATES

RELATED APPLICATIONS

This application is a continuation in part application of application Ser. No. 08/293,699 filed Aug. 19, 1994 and 07/874,178 filed Apr. 24, 1992 now abandoned said first application Ser. No. 08/293,699 is a divisional application of Ser. No. 07/874,178 which application Ser. No. 07/874, 178 is a continuation in part of application Ser. No. 770,557, filed Oct. 3, 1991 now abandoned, which application is a continuation in part of application Ser. No. 621,660 filed Dec. 3, 1990 now U.S. Pat. No. 5,204,140 which application in turn is a continuation-in-part of application Ser. Nos. 348, 789 now U.S. Pat. No. 5,167,820; 348,788 now U.S. Pat. No. 5,039,845; 348,787 now abandoned and 348,786 now U.S. Pat. No. 5,182,165 each filed May 8, 1989, each of which applications is a continuation-in-part of application Ser. Nos. 272,517 and 272,539, each filed Nov. 17, 1988, each now abandoned each of which application in turn, is a continuation-in-part of application Ser. No. 082,277, filed Aug. 6, 1987 (now U.S. Pat. No. 4,787,125) which application, in turn, is a division of application Ser. No. 843,047, filed Mar. 24, 1986, now U.S. Pat. No. 4,713,306. Each of these earlier filed applications and these U.S. Patents are incorporated in its entirety herein by reference.

BACKGROUND OF THE INVENTION

The present invention relates to a process for coating a substrate. More particularly, the invention relates to coating a substrate with a tin oxide-containing material, preferably an electrically conductive tin oxide-containing material and to coated porous substrates.

An application where substrates with coatings, e.g., electrically conductive coatings, find particular usefulness is in the promotion of chemical reactions, e.g., gas/liquid phase reactions, electro catalytic reactions, photo catalytic reactions, redox reactions, etc. As an example of a type of reaction system, a catalytic, e.g., metallic, component is contacted with the material to be reacted, e.g., hydrocarbon, carbon monoxide is passed through or near to the catalytic component to enhance the chemical reaction, e.g., hydrocarbon, carbon monoxide oxidation to carbon dioxide and water and nitrogen oxide reduction to nitrogen. In addition, using a substrate for the catalytic component which is coated with an electrically conductive material is highly advantageous for electro and photoelectron catalysis and/or rapid heat transfer to catalyst surfaces since a field/current can be effectively and efficiently provided to or near the catalytic component for electron transfer reactions. Many types of chemical reactions can be advantageously promoted using such coated substrates. Tin oxide containing coatings on substrates may promote a electron transfer whether or not the chemical reaction is conducted in the presence of a electro photo electro current or field. In addition, tin oxide coated substrates and sintered tin dioxides are useful as gas sensors, and combustion type devices and articles. One or more other components,m e.g., metal components, are often included in certain of these applications.

In many of the above-noted applications it would be advantageous to have an electrically, electronically conductive; electro mechanical tin oxide which is substantially uniform, has high electronic conductivity, and has good chemical properties, e.g., morphology, stability, etc.

A number of techniques may be employed to provide conductive tin oxide coatings on substrates. For example, the chemical vapor deposition (CVD) process may be employed. This process comprises contacting a substrate with a vaporous composition comprising a tin component and a dopant-containing material and contacting the contacted substrate with an oxygen-containing vaporous medium at conditions effective to form the doped tin oxide coating on the substrate. Conventionally, the CVD process occurs simultaneously at high temperatures at very short contact times so that tin oxide is initially deposited on the substrate. However tin oxide can form off the substrate resulting in a low reagent capture rate. The CVD process is well known in the art for coating a single flat surface which is maintained in a fixed position during the above-noted contacting steps. The conventional CVD process is an example of a "line-of-sight" process or a "two dimensional" process in which the tin oxide is formed only on that portion of the substrate directly in the path of the tin source as tin oxide is formed on the substrate. Portions of the substrate, particularly internal surfaces, which are shielded from the tin oxide being formed, e.g., such as pores which extend inwardly from the external surface and substrate layers which are internal at least partially shielded from the depositing tin oxide source by one or more other layers or surfaces closer to the external substrate surface being coated, do not get uniformly coated, if at all, in a "line-of-sight" process. Such shielded substrate portions either are not being contacted by the tin source during line-of-sight processing or are being contacted, if at all, not uniformly by the tin source during line-of-sight processing. A particular problem with "line-of-sight" processes is the need to maintain a fixed distance between the tin source and the substrate. Otherwise, tin dioxide can be deposited or formed off the substrate and lost, with a corresponding loss in process and reagent efficiency.

One of the preferred substrates for use as catalysts including use as a catalyst additive in batteries, such as the positive active material of lead-acid batteries, are inorganic substrates, in particular flakes, spheres, fibers and other type particles. Although the CVD process is useful for coating a single flat surface, for the reasons noted above this process tends to produce non-uniform and/or discontinuous coatings on non-flat, non-equidistant surfaces and/or three dimensional surfaces having inner shielded surfaces and/or the processing is multi-step and/or complex and/or time consuming. Such non uniformities and/or discontinuities and/or processing deficiencies are detrimental to the electrical and chemical properties of the coated substrate. A new process, e.g., a "non-line-of-sight" or "three dimensional" process, useful for coating such substrates would be advantageous. As used herein, a "non-line-of-sight" or "three dimensional" process is a process which coats surfaces of a substrate with tin oxide which surfaces would not be directly exposed to tin oxide-forming compounds being deposited on the external surface of the substrate during the first contacting step and/or to improve the processability to conductive components and articles and/or for the type of substrate to be coated. In other words, a "three dimensional" process coats coatable substrate surfaces which are at least partially shielded by other portions of the substrate which are closer to the external surface of the substrate and/or which are further from the tin oxide forming source during processing, e.g., the internal and/or opposite side surfaces of a glass or ceramic fiber or spheres, or flakes or other shapes or surfaces.

Although a substantial amount of work has been done, there continues to be a need for a new method for coating substrates, particularly three dimensional substrates with tin oxides. The prior art processes described below follow conventional processing techniques such as by sintering of a tin oxide and/or the instantaneous conversion to tin oxide by spray pyrolysis.

For example in "Preparation of Thick Crystalline Films of Tin Oxide and Porous Glass Partially Filled with Tin Oxide," R. G. Bartholomew et al, J. Electrochem, Soc. Vol. 116, No. 9, p1205(1969), a method is described for producing films of $SnO_2$ on a 96% silica glass substrate by oxidation of stannous chloride. The plates of glass are pretreated to remove moisture, and the entire coating process appears to have been done under anhydrous conditions. Specific electrical resistivity values for $SnO_2$-porous glass were surprisingly high. In addition, doping with $SbCl_3$ was attempted, but substantially no improvement, i.e., reduction, in electrical resistivity was observed. Apparently, no effective amount of antimony was incorporated. No other dopant materials were disclosed.

In "Physical Properties of Tin Oxide Films Deposited by Oxidation of $SnCl_2$," by N. Srinivasa Murty et al, Thin Solid Films, 92(1982) 347–354, a method for depositing $SnO_2$ films was disclosed which involved contacting a substrate with a combined vapor of $SnCl_2$ and oxygen. Although no dopants were used, dopant elements such as antimony and fluorine were postulated as being useful to reduce the electrical resistivity of the $SnO_2$ films.

This last described method is somewhat similar to the conventional spray pyrolysis technique for coating substrates. In the spray pyrolysis approach tin chloride dissolved in water at low pH is sprayed onto a hot, i.e., on the order of about 600° C., surface in the presence of an oxidizing vapor, e.g., air. The tin chloride is immediately converted, e.g., by hydrolysis and/or oxidation, to $SnO_2$, which forms a film on the surface. In order to get a sufficient $SnO_2$ coating on a glass fiber substrate to allow the coated substrate to be useful as a component of a lead-acid battery, on the order of about 20 spraying passes on each side have been required. In other words, it is frequently difficult, if not impossible, with spray pyrolysis to achieve the requisite thickness and uniformity of the tin oxide coating on substrates, in particular three dimensional substrates.

Dislich, et al U.S. Pat. No. 4,229,491 discloses a process for producing cadmium stannate layers on a glass substrate. The process involved dipping the substrate into an alcoholic solution of a reaction product containing cadmium and tin; withdrawing the substrate form the solution in a humid atmosphere; and gradually heating the coated substrate to 650° C. whereby hydrolysis and pyrolysis remove residues from the coated substrate. Dislich, et al is not concerned with coating substrates for lead-acid batteries, let alone the stability required, and is not concerned with maintaining a suitable concentration of a volatile dopant, such as fluoride, in the coating composition during production of the coated substrate.

Pytlewski U.S. Pat. No. 4,229,491 discloses changing the surface characteristics of a substrate surface, e.g., glass pane, by coating the surface with a tin-containing polymer. These polymers, which may contain a second metal such as iron, cobalt, nickel, bismuth, lead, titanium, canadium, chromium, copper, molybdenum, antimony and tungsten, are prepared in the form of a colloidal dispersion of the polymer in water. Pytlewski discloses that such polymers, when coated on glass surfaces, retard soiling. Pytlewski is not concerned with the electrical properties of the polymers or of the coated substrate surfaces.

Gonzalez-Oliver, C. J. R. and Kato, I. in "Sn (Sb)-Oxide Sol-Gel Coatings of Glass," Journal of Non-Crystalline Solids 82(1986) 400–410 North Holland, Amsterdam, describe a process for applying an electrically conductive coating to glass substrates with solutions containing tin and antimony. This coating is applied by repeatedly dipping the substrate into the solution of repeatedly spraying the solution onto the substrate. After each dipping or spraying, the coated substrate is subjected to elevated temperatures on the order to 550° C.–600° C. to fully condense the most recently applied layer. Other workers, eg., R. Pryane and I. Kato, have disclosed coating glass substrates, such as electrodes, with doped tin oxide materials. The glass substrate is dipped into solution containing organo-metallic compounds of tin and antimony. Although multiple dippings are disclosed, after each dipping the coated substrate is treated at temperatures between 500° C. and 630° C. to finish off the polycondensation reactions, particularly to remove deleterious carbon, as well as to increase the hardness and density of the coating.

SUMMARY OF THE INVENTION

A new process for at least partially coating a substrate with a tin oxide-forming material has been discovered. In brief, the process comprises contacting the substrate with a tin oxide precursor, for example, stannous chloride, in a vaporous form and/or in a liquid form and/or in a solid (e.g., powder) form, to form a tin oxide precursor-containing coating, for example, a stannous chloride-containing coating, on the substrate; preferably contacting the substrate with a fluorine component, i.e., a component containing free fluorine and/or combined fluorine (as in a compound), to form a fluorine component-containing coating on the substrate; and contacting the coated substrate with an oxidizing agent to form a tin oxide-containing, preferably tin dioxide-containing, coating on the substrate. The contacting of the substrate with the tin oxide precursor and with the fluorine component can occur together, i.e., simultaneously, and/or in separate steps.

This process can provide coated substrates which have substantial electrical conductivity so as to be suitable for use as components in batteries, such as lead-acid storage batteries. Substantial coating uniformity, e.g., in the thickness of the tin oxide-containing coating and in the distribution of dopant component in the coating, is obtained. Further, the present fluorine or fluoride doped tin oxide coated substrates have outstanding stability, e.g., in terms of electrical properties and morphology, and are thus useful in various applications. In addition, the process is efficient in utilizing the materials which are employed to form the coated substrate.

DETAILED DESCRIPTION OF THE INVENTION

In one broad aspect, the present coating process comprises contacting a substrate with a composition comprising a tin oxide precursor, such as tin chloride forming components, including stannic chloride, stannous chloride, tin complexes and mixtures thereof, preferably stannous chloride, at conditions, preferably substantially non-deleterious oxidizing conditions, more preferably in a substantially inert environment or atmosphere, effective to form a tin oxide precursor-containing coating, such as a stannous chloride-containing coating, on at least a portion of the substrate. The substrate is preferably also contacted with at least one dopant-forming component, such as at least one fluorine component, at conditions, preferably substantially non-deleterious oxidizing conditions, more preferably in a substantially inert atmosphere, effective to form a dopant-forming component-containing coating, such as a fluorine component-containing coating, on at least a portion of the substrate. This substrate, including one or more coatings containing tin oxide precursor, for example tin chloride and preferably stannous chloride, and preferably a dopant-forming component, for example a fluorine component, is contacted with at least one oxidizing agent at conditions effective to convert the tin oxide precursor to tin oxide and form a tin oxide-containing, preferably tin dioxide-containing, coating, preferably a doped, e.g., fluorine or fluoride doped, tin oxide-containing coating, on at least a portion of the substrate. By "non-deleterious oxidation" is meant that the majority of the oxidation of tin oxide precursor, for example stannous chloride, coated onto the substrate takes place in the oxidizing agent contacting step of the process after distribution and/or equilibration of the precursor, rather than in process step or steps conducted at non-deleterious oxidizing conditions. The process as set forth below will be described in many instances with reference to stannous chloride, which has been found to provide particularly outstanding process and product properties. However, it is to be understood that other suitable tin oxide precursors are included within the scope of the present invention.

The dopant-forming component-containing coating may be applied to the substrate before and/or after and/or during the time the substrate is coated with stannous chloride. In a particularly useful embodiment, the stannous chloride and the dopant-forming component are both present in the same composition used to contact the substrate so that the stannous chloride-containing coating further contains the dopant-forming component. This embodiment provides processing efficiencies since the number of process steps is reduced (relative to separately coating the substrate with stannous chloride and dopant-forming component). In addition, the relative amount of stannous chloride and dopant-forming component used to coat the substrate can be effectively controlled in this "single coating composition" embodiment of the present invention.

In another useful embodiment, the substrate with the stannous chloride-containing coating and the dopant-forming component-containing coating is maintained at conditions, preferably at substantially non-deleterious oxidizing conditions, for example, conditions which reduce and/or minimize the formation of tin oxide on a relatively small portion of the substrate or off the substrate, for a period of time effective to do at least one of the following: (1) coat a larger portion of the substrate with stannous chloride-containing coating; (2) distribute the stannous chloride coating over the substrate; (3) make the stannous chloride-containing coating more uniform in thickness; and (4) distribute the dopant-forming component more uniformly in the stannous chloride-containing coating. Such maintaining preferably occurs for a period of time in the range of about 0.05 or 0.1 minute to about 20 minutes in the presence of an inert gas an/or oxygen i.e. air, under non-deleterious oxidizing conditions. Such maintaining is preferably conducted at the same or a higher temperature relative to the temperature at which the substrate/stannous chloride-containing composition contacting occurs. Such maintaining, in general, acts to make the coating more uniform and, thereby, for example, provides for beneficial electrical conductivity properties. The thickness of the tin oxide-containing coating is preferably in the range of about 0.1 micron to about 10 microns, more preferably about 0.25 micron to about 1.25 microns.

In another useful embodiment, the coating process comprises contacting a porous substrate, particularly, porous particle substrates with a composition comprising a tin oxide precursor at conditions, preferably substantially non-deleterious oxidizing conditions, effective to form a tin oxide precursor containing coating such as a stannous chloride containing coating, preferentially, on the outer surface of the substrate preferably a majority of the outer surface while limiting and/or controlling differentially to the outer surface the coating of the open internal pore surface of said substrate. The substrate including one or more coatings containing tin oxide precursor and preferably a dopant forming component, for example, a fluorine component is contacted with at least one oxidizing agent at conditions effective to convert the tin oxide precursor to tin oxide and form a tin oxide containing, preferably tin dioxide containing coating, preferably a doped, e.g., fluorine or fluoride doped tin oxide containing coating, preferentially, on the outer surface of the substrate while limiting and/or controlling the amount of coating in the internal pores of the substrate. In general, the outer surface is the surface that would contact the surface of another particle of similar size and geometry by for example forming a conductive electrical contact between such outer surfaces. As set forth above, it is preferred to have a majority of such outer surfaces on an area basis coated, more preferably greater than about 70% and still more preferably, greater than about 90% of such outer surface. In general, the coating of the open internal porous surfaces is controlled and/or limited to provide a non-coated internal surface, preferably to provide at least about 10% non-coated internal surface on an internal surface area basis, more preferably, at least about 30%, still more preferably, at least about 50% and still more preferably, at least about 70% non-coated internal surfaces. The process for preferentially coating the substrate outer surface while limiting the coating in the internal pores and surfaces of the substrate provides unique and unexpected properties in many various applications, particularly, in lead acid battery, resistance resistant heating, catalysis and shielding applications.

The stannous chloride which is contacted with the substrate is in a vaporous phase or state, or in a liquid phase or state, or in a solid state or phase (powder) at the time of the contacting. The composition which includes the stannous chloride preferably also includes the dopant-forming component or components. This composition may also include one or more other materials, e.g., dopants, catalysts, grain growth inhibitors, solvents, etc., which do not substantially adversely promote the premature hydrolysis and/or oxidation of the stannous chloride and/or the dopant-forming component, and do not substantially adversely affect the properties of the final product, such as by leaving a detrimental residue in the final product prior to the formation of the tin oxide-containing coating. Thus, it has been found to be important, e.g., to obtaining a tin oxide coating with good structural, mechanical and/or electronic properties, that undue hydrolysis of the tin chloride and dopant-forming component be avoided. This is contrary to certain of the prior art which actively utilized the simultaneous hydrolysis reaction as an approach to form the final coating. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the tin chloride and/or dopant-forming component to be contacted with the substrate. It has also been found that the substrate can first be contacted with a tin oxide precursor powder, particularly stannous chloride powder, preferably with a film forming amount of such powder, followed by increasing the temperature of the powder to the liquidous point of the powder on the substrate and maintaining the coated substrate for a period of time at conditions including the increased temperature effective to do at least one of the following: (1) coat a larger portion of the substrate with the tin oxide precursor-containing coating; (2) distribute the coating over the substrate; and (3) make the coating more uniform in thickness. Preferably, this step provides for the equilibration of the coating on the substrate. The size distribution of the powder, for example, tin chloride powder, and the amount of such powder applied to the substrate are preferably chosen so as to distribute the coating over substantially the entire substrate.

The tin oxide precursor powder can be applied to the substrate as a powder, particularly in the range of about 5 or about 10 to about 125 microns in average particle size the size in part being a function of the particle size, i.e. smaller particles generally require smaller size powders. The powder is preferably applied as a charged fluidized powder, in particular having a charge opposite that of the substrate or at a temperature where the powder contacts and adheres to the substrate. In carrying out the powder coating, the coating system can be, for example, one or more electrostatic fluidized beds, spray systems having a fluidized chamber, and other means for applying powder, preferably in a film forming amount. The amount of powder used is generally based on the thickness of the desired coating and incidental losses that may occur during processing. The powder process together with conversion to a tin oxide-containing coating can be repeated to achieve desired coating properties, such as desired gradient conductivities.

Typically, the fluidizing gaseous medium is selected to be compatible with the tin oxide precursor powder, i.e., to not substantially adversely affect the formation of a coating on the substrate during melting and ultimate conversion to a tin oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the tin oxide coating as previously discussed under equilibration and maintaining. The gas flow rate is typically selected to obtain fluidization and charge transfer to the powder. Fine powders require less gas flow for equivalent deposition. It has been found that small amounts of water vapor enhance charge transfer. The temperature for contacting the substrate with a powder precursor is generally in the range of about 0° C. to about 100° C. or higher, more preferably about 20° C. to about 40° C., and still more preferably about ambient temperature. The substrate however, can be at a temperatures the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, spheres, flakes, i.e., platelets, short fibers and other similar substrate, can be coated directly in a fluidized bed themselves with such substrates being in a fluidized motion or state. For fabrics, single fibers, rovings and tows a preferred method is to transport the fabric and/or roving directly through a fluidized bed for powder contacting. In the case of rovings and tows, a fiber spreader can be used which exposes the filaments within the fiber bundle to the powder. The powder coating can be adjusted such that all sides of the substrate fabric, roving and the like are contacted with powder. Typical contacting time can vary from seconds to minutes, preferably in the range of about 1 second to about 120 seconds, more preferably about 2 seconds to about 30 seconds.

Typical tin oxide precursor powders are those that are powders at powder/substrate contacting conditions and which are liquidous at the maintaining conditions, preferably equilibration conditions, of the present process. It is preferred that the powder on melting substantially wets the surface of the substrate, preferably having a low contact angle formed by the liquid precursor in contact with the substrate and has a relatively low viscosity and low vapor pressure at the temperature conditions of melting and maintaining, preferably melting within the range of about 100° C. to about 450° C. or higher, more preferably about 250° C. to about 400° C. Typical powder tin oxide precursors are stannous chloride, low molecular weight organic salts or complexes of tin, particularly low molecular weight organic salts and complexes such as stannous acetate and acetylacetonate complexes of tin.

An additional component powder, such as a dopant-forming powder, can be combined with the tin oxide precursor powder. A particularly preferred dopant-forming powder is stannous fluoride. Further, an additional component, such as a dopant, for example a fluorine or fluoride component, indium, or antimony can be incorporated into the coating during the maintaining step, for example hydrogen fluoride gas as a source of fluoride. A combination of the two methods can also be used for additional component incorporation.

The powder tin oxide precursor on melting is maintained and/or equilibrated as set forth above. In addition, temperatures can be adjusted and/or a component introduced into the melting/maintaining step which can aid in altering the precursor for enhanced conversion to tin oxide. For example, gaseous hydrogen chloride can be introduced to form partial or total halide salts and/or the temperature can be adjusted to enhance decomposition of, for example, tin organic salts and/or complexes to more readily oxidizable tin compounds. The dopant can also be present in an oxide or precursor form in the melt as a dispersed preferably as a finely dispersed solid. The oxide can be incorporated advantageously as part of the powder coating of the substrate material.

A fluidizable coated substrate, such as substrates coated directly in a fluid bed of powder, can be subjected to conditions which allow liquidous formation by the tin oxide precursor and coating of the substrate. A particularly preferred process uses a film forming amount of the tin oxide precursor which allows for coating during the liquidous step of the process, and which substantially reduces detrimental substrate agglomeration. The conditions are adjusted or controlled to allow substantially free substrate fluidization and transport under the conditions of temperature and bed density, such as dense bed density to lean bed density. The coated substrate can be further transported to the oxidation step for conversion to tin oxide or converted directly to tin oxide in the same reactor/processing system. A particularly preferred embodiment is the transport of the liquidous coated substrate as a dense bed to a fluidized oxidation zone, such zone being a fluidized zone preferably producing a conversion to tin oxide on the substrate of at least about 80% by weight.

As set forth above, a particularly unique process and product embodiment of present invention is the preferential coating of the outer porous substrate surface while controlling and/or limiting the coating of the internal pores and surfaces of the porous substrate. The preferred process for such selective coating is the coating of a fluidizable coated substrate with a powder tin oxide precursor. The fluidization process is preferably carried out using a film forming amount of the tin oxide precursor. Such amount allows for coating and distribution on the outer particle surface during the liquidous step of the process. In addition, the process allows for control of the oxidation stage of the process for converting the tin oxide precursor film to tin oxide. The process parameters and substrate properties can be varied to provide the desired coating properties for a given application, particularly, surface area in $M^2/gm$, total pore volume (cc/gm) and pore size distribution including mean pore diameter, the film forming amount of tin oxide precursor, the temperature of the substrate, melt equilibrium temperature, residence time during liquidous/equilibrium maintaining oxidation temperature and time. It is preferred to control the residence time conditions for maintaining to the lower part of the range of about 0.05 or 0.1 minute to about 20 minutes, preferably, less than about 0.1 minute and still more preferably, less than about 0.05 minutes. The temperature of the substrate can be controlled to obtain the desired coating properties. For example, a powder coated substrate as set forth above can be introduced into a fluidization zone which zone is at a temperature above the melt temperature of the tin oxide precursor. By controlling the temperature of the zone and the maintaining residence time, a temperature differential between the outer surface and internal pores can be obtained which provide for preferential outer surface coating. In addition, the tin oxide precursor powder can be added to the fluidization zone in which the substrate is in fluid motion and at a temperature above the melt temperature of the tin oxide precursor. The tin oxide precursor powder can be introduced into the zone at a temperature below the temperature of the fluidization zone and in controlled amounts. The powder initially melts preferentially on the outer surface of the substrate. By controlling the maintaining residence time and by initiating the oxidation step, preferentially when the initial outer surface coating is achieved, the oxidation of the tin oxide precursor allows for the preferential stabilization and coating of the outer surface, i.e., coating of the internal pores of the substrate is reduced, often substantially relative to the coating and distribution that can occur prior to the oxidation step. It is preferred that the same reactor processing system be used for both the maintaining and oxidation steps in order to obtain controlled preferential coating of the outer surface. As set forth above, various other materials, such as, dopants, catalysts, etc., can be utilized in the process and products of this invention.

As set forth above, the properties of the substrates will vary according to the application for use of the products. Thus, the physical properties, particularly, bulk density, surface area, total pore volume, pore size distribution and apparent porosity can vary and/or be optimized according to a particular application. The process can be practiced to preferentially coat the surface of various substrates having a range of physical properties and in addition, preferentially the outer surface and selective coat, for example, an internal pore surface to a certain depth using the process conditions as set forth above.

The stannous chloride and/or dopant-forming component to be contacted with the substrate may be present in a molten state. For example, a melt containing molten stannous chloride and/or stannous fluoride and/or other fluoride salt may be used. The molten composition may include one or more other materials, having properties as noted above, to produce a mixture, e.g., a eutectic mixture, having a reduced melting point and/or boiling point. The use of molten stannous chloride and/or dopant-forming component provides advantageous substrate coating while reducing the handling and disposal problems caused by a solvent. In addition, the substrate is very effectively and efficiently coated so that coating material losses are reduced.

The stannous chloride and/or dopant-forming component to be contacted with the substrate may be present in a vaporous and/or atomized state. As used in this context, the term "vaporous state" refers to both a substantially gaseous state and a state in which the stannous chloride and/or dopant-forming component are present as drops or droplets and/or solid dispersion such as colloidal dispersion in a carrier gas, i.e., an atomized state. Liquid state stannous chloride and/or dopant-forming component may be utilized to generate such vaporous state compositions.

In addition to the other materials, as noted above, the composition containing stannous chloride and/or the dopant-forming component may also include one or more grain growth inhibitor components. Such inhibitor component or components are present in an amount effective to inhibit grain growth in the tin oxide-containing coating. Reducing grain growth leads to beneficial coating properties, e.g., higher electrical conductivity, more uniform morphology, and/or greater overall stability. Among useful grain growth inhibitor components are components which include at least one metal, in particular potassium, calcium, magnesium, silicon and mixtures thereof. Of course, such grain growth inhibitor components should have no substantial detrimental effect on the final product.

The dopant-forming component may be deposited on the substrate separately from the stannous chloride, e.g., before and/or during and/or after the stannous chloride/substrate contacting. If the dopant-forming component is deposited on the substrate separately from the stannous chloride, it is preferred that the dopant-forming component, for example, the fluorine component, be deposited after the stannous chloride, such as to form soluble and/or eutectic mixtures and/or dispersions.

Any suitable dopant-forming component may be employed in the present process. Such dopant-forming component should provide sufficient dopant so that the final doped tin oxide coating has the desired properties, e.g., electronic conductivity, stability, etc. Fluorine components are particularly useful dopant-forming components. Care should be exercised in choosing the dopant-forming component or components for use. For example, the dopant-forming component should be sufficiently compatible with the stannous chloride so that the desired doped tin oxide coating can be formed. Dopant-forming components which have excessively high boiling points and/or are excessively volatile (relative to stannous chloride), at the conditions employed in the present process, are not preferred since, for example, the final coating may not be sufficiently doped and/or a relatively large amount of the dopant-forming component or components may be lost during processing. It may be useful to include one or more property altering components, e.g., boiling point depressants, in the composition containing the dopant-forming component to be contacted with the substrate. Such property altering component or components are included in an amount effective to alter one or more properties, e.g., boiling point, of the dopant-forming component, e.g., to improve the compatibility or reduce the incompatibility between the dopant-forming component and stannous chloride.

Particularly useful anion dopants, particularly fluorine components for use in the present invention are selected from stannous fluoride, stannic fluoride, hydrogen fluoride, ammonium fluoride and mixtures thereof. When stannous fluoride is used as a fluorine component, it is preferred to use one or more boiling point depressants to reduce the apparent boiling point of the stannous fluoride, in particular to at least about 850° C. or less. The preferred dopants are those that provide for optimum dopant incorporation while minimizing dopant precursor losses, particularly under the preferred process conditions as set forth therein. In addition oxides or sub-oxides can also be used, including where dopant incorporation is accomplished during the oxidation sintering contacting step.

The use of a fluorine or fluoride dopant is an important feature of certain aspects of the present invention. First, it has been found that fluorine dopants can be effectively and efficiently incorporated into the tin oxide-containing coating. In addition, such fluorine dopants act to provide tin oxide-containing coatings with good electronic properties referred to above, morphology and stability. This is in contrast to certain of the prior art which found antimony dopants to be ineffective to improve the electronic properties of tin oxide coatings in specific applications.

The liquid, e.g., molten, composition which includes stannous chloride may, and preferably does, also include the dopant-forming component. In this embodiment, the dopant-forming component or components are preferably soluble and/or dispersed homogeneously and/or atomized in the composition. Vaporous mixtures of stannous chloride and dopant-forming components may also be used. Such compositions are particularly effective since the amount of dopant in the final doped tin oxide coating can be controlled by controlling the make-up of the composition. In addition, both the stannous chloride and dopant-forming component are deposited on the substrate in one step. Moreover, if stannous fluoride and/or stannic fluoride are used, such fluorine components provide the dopant and are converted to tin oxide during the oxidizing agent/substrate contacting step. This enhances the overall utilization of the coating components in the present process. Particularly useful compositions comprise about 50% to about 98%, more preferably about 70% to about 95%, by weight of stannous chloride and about 2% to about 50%, more preferably about 5% to about 30%, by weight of fluorine component, in particular stannous fluoride.

In one embodiment, a vaporous stannous chloride composition is utilized to contact the substrate, and the composition is at a higher temperature than is the substrate. The make-up of the vaporous stannous chloride-containing composition is such that stannous chloride condensation occurs on the cooler substrate. If the dopant-forming component is present in the composition, it is preferred that such dopant-forming component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous stannous chloride-containing composition. As noted above, previous vapor phase coating methods have often been handicapped in requiring that the substrate be repeatedly recontacted in order to get the desired coating thickness. The present "condensation" embodiment reduces or eliminates this problem.

The substrate including the stannous chloride-containing coating and the dopant-forming component-containing coating is contacted with an oxidizing agent at conditions effective to convert stannous chloride to tin oxide, preferably substantially tin dioxide, and form a doped tin oxide coating on at least a portion of the substrate. Water, e.g., in the form of a controlled amount of humidity, is preferably present during the coated substrate/oxidizing agent contacting. This is in contrast with certain prior tin oxide coating methods which are conducted under anhydrous conditions. The presence of water during this contacting has been found to provide a doped tin oxide coating having excellent electrical conductivity properties.

Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable material and may be in any suitable form. Preferably, the substrate is such so as to minimize or substantially eliminate deleterious substrate, coating reactions and/or the migration of ions and other species, if any, from the substrate to the tin oxide-containing coating which are deleterious to the functioning or performance of the coated substrate in a particular application. In addition, it can be precoated to minimize migration, for example an alumina and/or a silica precoat and/or to improve wetability and uniform distribution of the coating materials on the substrate. In order to provide for controlled electrical conductivity in the doped tin oxide coating, it is preferred that the substrate be substantially non-electronically conductive when the coated substrate is to be used as a component of an electric energy storage battery. In one embodiment, the substrate is inorganic, for example glass and/or ceramic. Although the present process may be employed to coat two dimensional substrates, such as substantially flat surfaces, it has particular applicability in coating three dimensional substrates. Thus, the present process provides substantial process advances as a three dimensional process. Examples of three dimensional substrates which can be coated using the present process include particles, i.e., flakes, extrudates, spheres, single fibers, chopped fibers, porous substrates, irregularly shaped particles, e.g., catalyst supports and multi-channel monoliths, tubes, conduits, fiber rovings, fiber mats and the like.

The coated porous particles are particularly useful in a number of applications, particularly lead acid batteries, for example, monopolar and bipolar batteries, catalysts, resistance heating elements, electrostatic dissipation elements, electromagnetic interference shielding elements, electrostatic bleed elements, protective coatings, field dependent fluids and the like. In practice the particles which are preferred for use in such applications in general have an average length in the range of from about 20 microns to about 7 mm and an average thickness in the range of from about 20 microns to about 7 mm, the average length and thickness being different or the same depending on particle geometry and application. As set forth above, the substrates can be optimized for a particular application and the particular electrical and/or mechanical requirements associated with such end use application. For example, in applications in which the particles are combined with other materials, such as polymers and positive active material of lead acid battery and depending on the requirements of the application, ranges of from about 3 microns to about 300 microns, or even less than about 5 microns, typically ranges of from about 3 microns to about 150 microns or from about 5 microns to about 75 microns are useful. For example, processing of a porous coated substrate filled matrix material, for example a polymer matrix material may be optimized in substrate porosity for mechanical, structural and reduced weight and by an aspect ratio and/or volume concentration to optimize the formation of for example a conductive network within such matrix material. The products of this invention offer particular advantages in many of such applications disclosed herein, including enhanced dispersion and rheology, particularly in various compositions such as polymer compositions, coating compositions, various other liquid and solid type compositions and systems for producing various products such as coatings and polymer composites.

As set forth above, the porous inorganic substrates can be characterized by bulk density (gm/cc) which is the weight or mass per unit volume considered only for the particle itself, i.e., includes the internal pore volume, surface area ($M^2$/gm), total pore volume (cc(hg)/gm), pore size distribution and percent apparent porosity. In general, it is preferred that the bulk density be from about 3% to about 85% more preferably from about 10% to about 70%, more preferably, from about 10% to about 60% of the true density of the substrate material. Bulk densities less than about 5% are also useful. In addition, the porous substrate can have a wide range of surface area ($M^2$/gm) of from about 0.01 to about 700 preferably having a moderate to high surface area, preferably, from about $10M^2$/gm to about $600M^2$/gm, more preferably, from about $50M^2$/gm to about $500M^2$/gm. The pore volume is preferably from about 0.4 cc/gm to about 3.5 cc/gm, or even up to about 5 cc/gm, more preferably from about 0.7 cc/gm to about 3.50 cc/gm or even up to about 4.5 cc/gm more preferably from about 0.7 cc/gm to about 3.25 cc/gm. The pore size distribution can vary over a wide range and can have various distributions including multi-modal, for example, bi-modal distribution of pores including macro pores and micro pores. There ideally exists a relationship between pore diameter, surface area and pore volume, thus fixing any two variables generally determines the third. In general, the mean (50%) pore diameter for macro pores, i.e., generally classified as having a pore diameter greater than about 750 angstroms can vary from about 0.075 microns to about 150 microns, more preferably, from about 0.075 microns to about 10 microns. Micro porosity, generally classified as a porosity having a mean pore diameter of less than about 750 angstroms can vary over a wide range. In general, the mean pore diameter for micro porosity can vary from about 20 angstroms to about 750 angstroms, more preferably, from about 70 angstroms to about 600 angstroms. The ratio of macro to micro porosity can vary over a wide range and depending on the application, can be varied to provide optimized performance as more fully set forth under the various applications. In general, the ratio of percent macro porosity to micro porosity expressed as that percent of the total porosity can vary from about 0% to about 95%, more preferably, from about 5% to about 80% macro porosity and from about 100% to about 5%, more preferably from about 95% to about 20% micro porosity.

As set forth above, the porous substrate can be inorganic for example, carbon and carbide, i.e., silicon carbide and/or an inorganic oxide. Typical examples of inorganic oxides which are useful as substrates include for example, substrates containing one or more alumino silicate, silica, alumina, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, perovskites, spinels, aluminates, silicates, e.g., zirconium silicate, mixtures thereof and the like. As set forth above, porous substrate materials can be in many forms and shapes, especially shapes which are not flat surfaces, i.e., non line-of-site materials such as pellets, extrudates, beads, including spheres, flakes, aggregates, rings, saddles, stars and the like. The percent apparent porosity, i.e., the volume of open pores expressed as a percentage of the external volume can vary over a wide range and in general, can vary from about 20% to about 92%, more preferably, from about 40% to about 90%. In practice, the bead particles, including spheres, which are preferred for use in such applications in general have a roundness associated with such particles generally greater than about 70% still more preferably, greater than about 85% an still more preferably, greater than about 95%. The bead products of this invention offer particular advantages in many of such applications disclosed herein, including enhanced dispersion and rheology, particularly, in various compositions such as polymer compositions, coating compositions, various other liquid and solid type compositions and systems for producing various products such as coatings and polymer composites.

The particular substrate, including chemical composition can be optimized for the processing conditions utilized to coat the substrate with tin oxide. In general, the substrate and process conditions are selected to provide preferential outer surface coating, including capillary effects reduce adverse substrate tin oxide precursor interactions and/or substrate decomposition which is substantially deleterious to the final properties of the tin oxide coated substrate. The preferred inorganic oxides for various applications, as well as the average particle size, density and additional components associated with the tin dioxide coated porous particle, are set forth below under lead acid batteries, catalysts, resistance heating elements, electrostatic dissipation elements, electromagnetic interference shielding elements, electrostatic bleed elements, protective coatings, field dependent fluids and the like.

Acid resistant inorganic substrates, especially fibers, flakes, and woven and non-woven mats of acid resistant glass fibers, are particularly useful substrates when the doped tin oxide coated substrate is to be used as a component of a battery, such as a lead-acid electrical energy storage battery. More particularly, the substrate for use in a battery, particularly a bipolar battery is in or can be in the form of a body of woven or non-woven fibers, still more particularly, a body of fibers having a porosity in the range of about 60% to about 95%. Porosity is defined as the percent or fraction of void space within a body of fibers. The above-noted porosities are calculated based on the fibers including the desired fluorine doped tin oxide coating.

The porous substrate for use in lead-acid batteries, because of availability, cost and performance considerations, generally comprises acid resistant glass, and/or ceramics more preferably in the form of particles, for example, fibers, and/or flakes, and/or beads including spheres and/or extrudates as noted above.

The substrate for use in lead-acid batteries is acid resistant. That is, the substrate exhibits some resistance to corrosion, erosion and/or other forms of deterioration at the conditions present, e.g., at or near the positive plate, or positive side of the bipolar plates, in a lead-acid battery. Although the fluorine doped tin oxide coating does provide a degree of protection for the substrate against these conditions, the substrate should itself have an inherent degree of acid resistance. If the substrate is acid resistant, the physical integrity and electrical effectiveness of the doped tin oxide coating and of the whole present battery element, is better maintained with time relative to a substrate having reduced acid resistance. If glass is used as the substrate, it is preferred that the glass have an increased acid resistance relative to E-glass. Preferably, the acid resistant glass substrate is at least as resistant as is C-or T- glass to the conditions present in a lead-acid battery.

Typical compositions of E-glass and C-glass are as follows:

|  | Weight Percent | | |
| --- | --- | --- | --- |
|  | E-glass | C-glass | T-glass |
| Silica | 54 | 65 | 65 |
| Alumina | 14 | 4 | 6 |
| Calcia | 18 | 14 | 10* |
| Magnesia | 5 | 3 | — |
| Soda + Potassium Oxide | 0.5 | 9 | 13 |
| Boria | 8 | 5 | 6 |
| Titania + Iron Oxide | 0.5 | — | — |

*including MgO

Preferably the glass contains more than about 60% by weight of silica and less than about 35% by weight of alumina, and alkali and alkaline earth metal oxides.

As set forth above, one of the preferred applications for use of the coated porous substrates is in lead acid batteries. Thus, the coated substrates can be added directly to the positive active material of a lead acid battery, i.e., the positive electrode to improve battery performance, particularly, positive active material utilization efficiency, formation efficiency and recharge efficiency. One particular, unique aspect of the coated porous substrates is that the coated substrate has both enhanced properties from the conductive coating and in addition, is able to provide an internal reservoir for holding sulfuric acid electrolyte required for carrying out the electro-chemical reactions in the positive active material. More particularly, the combination of conductive coating and porosity improves overall, high rate performance of the positive active material, i.e., improved utilization efficiency at varying rates of discharge time, including high rates and at short discharge times.

As set forth above, the physical properties of the porous substrates can vary widely. It is preferred that the substrate have sufficient macro porosity and percent apparent porosity to allow for the utilization of the electrolyte sulfuric acid contained in the pores during discharge of the positive active material and, in addition, that the bulk density be selected to reduce the overall weight of the positive active material while enhancing the overall performance of the battery. In general, the preferable percent apparent porosity can vary from about 40% to about 92%, more preferably, from about 70% to about 90%. The preferred ratio of percent macro porosity to percent micro porosity can vary over a wide range and in general is from about 20% to about 95% macro porosity, more preferably, from about 45% to about 90% macro porosity with the balance being micro porosity. The mean pore diameter, particularly mean macro pore diameter, can vary over a wide range with the utilization of electrolyte during the condition of the discharge of the battery being an important factor i.e., at high rate discharges, such as cold cranking, high macro porosity is preferred. Preferred mean macro pore diameter is from about 1 micron to about 150 microns, more preferably, from about 5 to about 100 microns or even from about 0.075 micron to about 10 micron and still more preferably from about 0.1 to about 5 microns.

As set forth above, a particularly preferred substrate is a porous particle, i.e. porous support, particularly beads, including spheres, extrudates, pellets, rings, saddles, stars, etc., preferably within the bulk density, macro porosity, micro porosity, apparent percent porosity and surface areas as set forth above. The coated particles can provide improved performance in various applications, particularly, in the positive active material of lead acid batteries. As set forth above, the porous substrate can provide a reservoir for electrolyte sulfuric acid which participates in the electrochemical reaction during discharge of the positive active material. A particularly unique embodiment of the present invention is the use of the porous substrate itself as an additive in the positive active material to provide a reservoir of electrolyte sulfuric acid while providing a light weight additive for incorporation into the positive active material. Such particles are porous and within the ranges as set forth above for the coated porous substrates, particularly the preferred ranges. Such porous substrates can be further coated with additional components such as with other surface components, which may improve recharge, i.e. oxidation as well as other conductive components. As set forth above, the porous substrate with or without an additional component provides unexpected improvement in the performance of the positive active material, particularly, in the high rate discharge conditions such as cold cranking under lower than ambient temperature conditions.

As set forth above the porous substrate are acid resistant and include a wide variety of materials, including inorganic and organic based materials. The porous substrates can be in a wide variety of shapes, including shapes that are reduced in size during the manufacture of the positive active material, such as in the blending and/or mixing of the porous substrate in positive active material manufacture. It is preferred that the resulting particles if reduced in size maintain porosity parameters within the ranges as set forth above. It is also preferred, that the particles have sufficient stiffness and or resistance to detrimental permanent deformation in order to maintain sufficient porosity for the sulfuric acid in the pores to participate in a number of repetitive discharge and charge cycles, such as greater than 50 cycles or even 100 cycles.

The conditions at which each of the steps of the present process occur are effective to obtain the desired result from each such step and to provide a substrate coated with a tin oxide-containing coating. The substrate/stannous chloride contacting and the substrate/dopant-forming component contacting preferably occur at a temperature in the range of about 250° C. to about 375° C., more preferably about 275° C. to about 350° C. The amount of time during which stannous chloride and/or dopant-forming component is being deposited on the substrate depends on a number of factors, for example, the desired thickness of the tin oxide-containing coating, the amounts of stannous chloride and dopant-forming component available for substrate contacting, the method by which the stannous chloride and dopant-forming component are contacted with the substrate and the like. Such amount of time is preferably in the range of about 0.5 minutes to about 20 minutes, more preferably about 1 minute to about 10 minutes.

If the coated substrate is maintained in a substantially non-deleterious oxidizing environment, as previously set forth, it is preferred that such maintaining occur at a temperature in the range of about 275° C. to about 375° C., more preferably about 300° C. to about 350° C. for a period of time in the range of about 0.1 minutes to about 20 minutes, more preferably about 1 minute to about 10 minutes. The coated substrate/oxidizing agent contacting preferably occurs at a temperature in the range of about 350° C. to about 600° C., more preferably about 400° C. to about 550° C., for a period of time in the range of about 0.1 minutes to about 10 minutes. A particular advantage of the process of this invention is the temperatures used for oxidation have been found to be lower, in certain cases, significantly lower, i.e., 50° to 100° C. than the temperatures required for spray hydrolysis. This is very significant and unexpected, provides for process efficiencies and reduces, and in some cases substan-tially eliminates, deleterious reactions and/or migration of deleterious elements from the substrate to the tin oxide layer. Excessive sodium migration, e.g., from the substrate, can reduce electronic conductivity.

The pressure existing or maintained during each of these steps may be independently selected from elevated pressures (relative to atmospheric pressure), atmospheric pressure, and reduced pressures (relative to atmospheric pressure). Slightly reduced pressures, e.g., less than atmospheric pressure and greater than about 8 psia and especially greater than about 11 psia, are preferred.

The tin oxide coated substrate, such as the fluorine doped tin oxide coated substrate, of the present invention may be, for example, a catalyst itself or a component of a product, such as a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the tin oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene difluoride, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

Further, the porous substrate as set forth above can be an acid resistant organic material, including organic polymeric materials as set forth above. Preferred polymers are polyolefin polymers, polyvinyl polymers, phenolformaldehyde polymers, polyesters, polyvinylesters and mixtures thereof. Preferred polymers are polyolefins, preferably polypropylene, phenolformaldehyde polymers and polyvinylester, particularly modacrylic polymers.

When used in battery applications, the present doped tin oxide coated substrate is preferably at least partially embedded in a matrix material. The matrix material should be at least initially fluid impervious to be useful in bipolar batteries. If the fluorine doped tin oxide coated substrate is to be used as a component in a battery, e.g., a lead-acid electrical energy storage battery, it is situated so that at least a portion of it contacts the positive active electrode material. Any suitable positive active electrode material or combination of materials useful in lead-acid batteries may be employed in the present invention. One particularly useful positive active electrode material comprises electrochemically active lead oxide, e.g., lead dioxide, material. A paste of this material is often used. If a paste is used in the present invention, it is applied so that there is appropriate contacting between the fluorine doped tin oxide coated substrate and the paste.

In order to provide enhanced bonding between the tin oxide coated substrate and the matrix material, such as a polymer matrix, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

A more complete discussion of the presently useful matrix materials is presented in Fitzgerald, et al U.S. Pat. No. 4,708,918, the entire disclosure of which is hereby incorporated by reference herein.

Various techniques, such as casting, molding and the like, may be used to at least partially encapsulate or embed the tin oxide coated substrate into the matrix material or materials and form composites. The choice of technique may depend, for example, on the type of matrix material used, the type and form of the substrate used and the specific application involved. Certain of these techniques are presented in U.S. Pat. No. 4,547,443, the entire disclosure of which is hereby incorporated by reference herein. One particular embodiment involves pre-impregnating (or combining) that portion of the tin oxide coated substrate to be embedded in the matrix material with a relatively polar (increased polarity relative to polypropylene) thermoplastic polymer, such as polyvinylidene difluoride, prior to the coated substrate being embedded in the matrix material. This embodiment is particularly useful when the matrix material is itself a thermoplastic polymer, such as modified polypropylene, and has been found to provide improved bonding between the tin oxide coated substrate and the matrix material.

The bonding between the matrix material and the fluorine doped tin oxide coated, acid-resistant substrate is important to provide effective battery operation. In order to provide for improved bonding of the fluorine doped tin oxide coating (on the substrate) with the matrix material, it is preferred to at least partially, more preferably substantially totally, coat the fluorine doped tin oxide coated substrate with a coupling agent which acts to improve the bonding of the fluorine doped tin oxide coating with the matrix. This is particularly useful when the substrate comprises acid resistant glass fibers. Any suitable coupling agent may be employed. Such agents preferably comprise molecules which have both a polar portion and a non-polar portion. Certain materials generally in use as sizing for glass fibers may be used here as a "size" for the doped tin oxide coated glass fibers. The amount of coupling agent used to coat the fluorine doped tin oxide coated glass fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. U.S. Pat. No. 4,154,638 discloses one silane-based coupling agent adapted for use with tin oxide surfaces. The entire disclosure of this patent is hereby expressly incorporated by reference herein.

In the embodiment in which the fluorine doped tin oxide coated substrate is used as a component of a bipolar plate in a lead-acid battery, it is preferred to include a fluid-impervious conductive layer that is resistant to reduction adjacent to, and preferably in electrical communication with, the second surface of the matrix material. The conductive layer is preferably selected from metal, more preferably lead, and substantially non-conductive polymers, more preferably synthetic polymers, containing conductive material. The non-conductive polymers may be chosen from the polymers discussed previously as matrix materials. One particular embodiment involves using the same polymer in the matrix material and in the conductive layer. The electrically conductive material contained in the non-conductive layer preferably is selected from the group consisting of graphite, lead and mixtures thereof.

In the bipolar plate configuration, a negative active electrode layer located to, and preferably in electric communication with, the fluid impervious conductive layer is included. Any suitable negative active electrode material useful in lead-acid batteries may be employed. One particularly useful negative active electrode material comprises lead, e.g., sponge lead. Lead paste is often used.

In yet another embodiment, a coated substrate including tin oxide, preferably electronically conductive tin oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of an electrical field or electrical current in proximity to the component. Thus, the tin oxide, preferably on a substantially non-electronically conductive substrate, e.g., a catalyst support, can provide an effective and efficient catalyst for chemical reactions, including those which occur or are enhanced when an electric field or current is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to electronic properties and/or morphology and/or stability, of the present tin oxides plays an important role in making useful and effective catalyst materials, particularly the higher surface area attainable tin oxide materials prepared in accordance with this invention, especially when compared to prior art processes which produce very low surface areas. Any chemical reaction, including a chemical reaction the rate of which is enhanced by the presence of an electrical field or electrical current as described herein, may be promoted using the present catalyst component tin oxide-containing coated substrates. A particularly useful class of chemical reactions are those involving chemical oxidation or reduction. For example, an especially useful and novel chemical reduction includes the chemical reduction of nitrogen oxides, to minimize air pollution, with a reducing gas such as carbon monoxide, hydrogen and mixtures thereof and/or an electron transferring electrical field. A particularly useful chemical oxidation application is a combustion, particularly catalytic combustion, wherein the oxidizable compounds, i.e., carbon monoxide and hydrocarbons are combusted to carbon dioxide and water. For example, catalytic converters are used for the control of exhaust gases from internal combustion engines and are used to reduce carbon monoxide and hydrocarbons from such engines. Of course, other chemical reactions, e.g., hydrocarbon reforming, dehydrogenation, such as alkylaromatics to olefins and olefins to dienes, hydrodecyclization, isomerization, ammoxidation, such as with olefins, aldol condensations using aldehydes and carboxylic acids and the like, may be promoted using the present catalyst component, tin oxide-containing coated substrates. As noted above, it is preferred that the tin oxide in the catalyst component, tin oxide-containing substrates be electronically conductive. Although fluorine doped tin oxide is particularly useful, other dopants may be incorporated in the present catalyst materials to provide the tin oxide with the desired electronic properties. For example, antimony may be employed as a tin oxide dopant. Such other dopants may be incorporated into the final catalyst component, tin oxide-containing coated substrates using one or more processing techniques substantially analogous to procedures useful to incorporate fluorine dopant, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acid; the isomerization of butenes; and the oxidation of methane to methanol. It is believed, without limiting the invention to any specific theory of operation, that the stability of the catalysts, the redox activity of the tin oxide, i.e., stannous, stannic, mixed tin oxide redox couple, morphology and the tin oxide catalytic and/or support interaction with other catalytic species provides for the making of useful and effective catalyst materials. In certain catalytic reactions, such as $NO_x$ reduction and oxidative dehydrogenation, it is believed that lattice oxygen from the regenerable tin oxide redox couple participates in the reactions.

The tin oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, water, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and zinc. The signal provided may be the result of the component of interest itself impacting the sensing component and/or it may be the result of the component of interest being chemically reacted, e.g., oxidized or reduced, in the presence of the sensing component.

The stability and durability for the present tin oxide materials are believed to make them very useful as catalysts, sensors, and supports for additional catalysts and sensors in aggressive and/or harsh environments, particularly acid, i.e., sulfur and nitrogen acid environments.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, cobalt molybdenum, tungsten, zinc, indium, the platinum group metals, i.e., platinum, palladium and rhodium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, etc.

As set forth above, the preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. Particularly useful catalyst supports are for example, porous particles, such as beads extrudates, pellets and other shapes as set forth above and a multi-channel monolith such as one made from cordierite which has been coated with alumina. The catalyst materials can be used as is or further processed such as by sintering of powered catalyst materials into larger aggregates. The aggregates can incorporate other powders, for example, other oxides, to form the aggregates.

As set forth above, the inorganic substrates, can include a wide variety of materials. Further examples of inorganic oxides for use in the manufacture of porous particles and monoliths are for example, cordierite, silicon carbide, silicon nitride, titania (such as anatase), alumina (preferably gamma alumina), titania and silica, magnesium aluminate spinel, mordenite, i.e., zeolite, silica, magnesia and mixtures thereof. The inorganic substrates, particularly the inorganic oxide supports are particularly useful and can be coated with a tin oxide forming component and converted to a tin oxide. The catalyst components (or sensing components) may be included with the coated substrate using any one or more of various techniques, e.g., conventional and well known techniques. For example, metal catalyst components (metal sensing components) can be included with the coated substrate by impregnation; electro-chemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the tin oxide forming component is placed on the substrate. Thus, a catalyst material, such as a salt or acid, e.g., a halide and preferably chloride, oxy chloride and chloro acids, e.g., chloro platinic acid, of the catalytic metal, is incorporated into the stannous chloride-containing coating of the substrate, prior to contact with the oxidizing agent, as described herein. This catalyst material can be combined with the stannous chloride and contacted with the substrate, or it may be contacted with the substrate separately from stannous chloride before, during and/or after the stannous chloride/substrate contacting.

One approach is to incorporate catalyst-forming materials into a process step used to form a tin oxide coating. This minimizes the number of process steps but also, in certain cases, produces more effective catalysts. The choice of approach, however, is dependent on a number of factors, including the process compatibility of tin oxide and catalyst-forming materials under given process conditions and the overall process efficiency and catalyst effectiveness.

The catalyst support and/or tin oxide coated support can be coated with a material, such as a high surface area forming material, for example a wash coat in order to increase surface area. It is preferred to form a high surface area prior to incorporating the active catalyst material. Various conventional and well known techniques for catalyst incorporation can be used.

As is known in the art, certain particulate supports can be made directly with high surface areas, however, others, can have low surface areas, i.e., about 0.1 to about 2 meter square per gram. Such surface areas are less than optimized for catalytic activity. In order to increase surface area, particularly for monoliths, the support can be coated with a high surface area material, such as an oxide forming material, particularly gamma alumina.

The thickness of the wash coat is generally less than about 0.1 mm. More typically, less than about 0.05 mm on the basis of overall average thickness. The coating generally comprises macro pores in the range of about 2 to about 10 microns and meso pores of from about 100 to about 200 angstroms. The type of distribution of pore size is generally referred to as a bimodal pore distribution.

As set forth above, the catalyst support can be coated with materials to provide and/or enhance a particular property. In addition to surface area, coatings can also incorporate an active catalyst component. For example, zeolites can be coated on the surface of the catalyst support, using for example a silica binder generally in the range from about 10 to 40 wt % binder, more preferably from about 20 to about 30 wt % binder. The concentration of binder is selected to maximize the availability of zeolite sites and to preserve the integrity of the coating.

A wide variety of materials, for example, inorganic oxides, can be used in the manufacture of catalysts. As set forth above, it is preferred to reduce deleterious interactions between the substrate and the tin oxide coating on the substrate, i.e., a deleterious interaction which substantially reduces the conductivity and/or catalyst activity and/or activity maintenance for the particular application. In addition, it is preferred to reduce deleterious interactions between non-tin oxide coatings with the active catalyst component where such additional coatings are utilized in the preparation of the catalyst.

As set forth above, the catalyst can be contacted with a tin oxide precursor, utilizing for example powder, slurry, vapor infiltration and the like, process to produce a coated substrate. In a preferred embodiment, the tin oxide precursor is converted to tin oxide followed by incorporation of the catalyst component. The catalyst component can be incorporated directly on the tin oxide surface and/or a coating such as a high surface area coating, can be applied to the tin oxide surface coating, prior to incorporation of the active catalyst component. In general, it is preferred to have a high surface area available for catalyst incorporation and dispersion, particularly for high activity catalysts used in high gas velocity type conversion processes. The selection of a coating such as a coating on the tin oxide surface, is in part a function of the chemical process, the chemical processing conditions, to which the catalyst surface is exposed. For example, deleterious reactions between the catalyst and/or coating, i.e., the formation of low temperature spinels, from the catalyst component and for example alumina component can reduce significantly both catalyst activity and activity maintenance. Such coatings are selected to reduce such deleterious interactions between the catalyst and coating and/or tin oxide surface. However, certain catalyst coating interactions, enhance catalyst activity conversion and activity maintenance. Such interactions are generally referred to as catalyst support interactions and/or strong catalyst support interactions. Catalyst components, coatings, including tin oxide coating, can be selected to enhance such catalyst support interactions.

As set forth above, the support can be coated with a barrier type coating, prior to contacting with a tin oxide precursor and subsequent conversion to a tin oxide coating on the monolith. The barrier coat can reduce substantial deleterious substrate/tin oxide interaction, as well as, providing a definable surface, generally from a porosity stand point, to control and/or regulate the quantity of tin oxide precursor used to obtain a design average coating thickness, including reduced penetration into the pores of the catalyst. In addition, a coating can be formed on the tin oxide surface to provide for improved catalyst performance, i.e., higher surface area, more effective dispersion of catalyst, interactions between the coating and catalyst which improves catalysts performance, i.e., catalyst coating interactions which improve catalyst performance and/or reduce deleterious interactions which substantially reduce overall catalyst performance. As set forth above, the tin oxide and added catalyst metal can be formed with or without the use of a coating on the tin oxide surface, with the use of a subsequent coating, i.e, a high surface area coating being a preferred approach to incorporate catalyst forming materials. The tin oxide coating, catalyst combinations, as set forth above, are preferred catalyst products of the present invention.

As set forth above, one of the preferred applications for the use of coated porous substrates is in catalysis. Thus, coated substrates having a controlled amount of coating on the outer surfaces while limiting the coating on the internal surfaces, allows a catalysis component to be incorporated on the coated surface and the uncoated surface, thus allowing for improved catalyst performance. For example, one particularly unique aspect of the coated porous substrate is that the coating on the substrate can have an enhanced property from the conductive coating and in addition, the substrate can provide an internal pore volume and surface area for incorporation of a catalytic material for carrying out catalytic reactions. Thus, for example, the coating can provide a surface which can be catalytic have improved abrasion resistance and in addition, resistively heated to allow the surface temperature to increase to reaction conditions by the application of, for example, a potential across a fixed bed of conductive particles having surface to surface contact for maintaining an electrical circuit. These feature can be particularly advantageous where the initiation of the chemical reaction is very important, such as the combustion of carbon monoxide and hydrocarbon during the early minutes of operation of an internal combustion engine or in particulate traps for example in the burning off of soot carbon. In addition, the coating of the outer surface for purposes of electroconductivity can allow for a reduction in eight of the particle based upon the uncoated, internal pore volume that remains in the particle.

As set forth above, the physical properties of the porous substrates can vary widely. It is preferred that the substrate have sufficient micro porosity and surface area to allow for improved catalytic activity of the catalyst contained on the surface and in the pores of the substrate. In general, the preferred range of mean micro pore diameter is from about 20 angstroms to about 600 angstroms, more preferably, from about 40 angstroms to about 150 angstroms. In general, the preferred mean macro pore diameter is from about 0.075 microns to about 10 microns, more preferably, from about 0.075 microns to about 5 microns. The preferred ratio of percent macro porosity to percent micro porosity can vary over a wide range and in general is from about 0% to about 40% macro porosity, more preferably, from about 5% to about 25% macro porosity with the balance being micro porosity.

As set forth above, the tin oxide substrate can be contacted with the catalyst forming material to incorporate the catalyst material after the conversion of the tin oxide precursor to tin oxide. As set forth above, various techniques, e.g., conventional and well known techniques can be utilized, i.e., impregnation and deposition from salt mixtures. For example, the tungsten and molybdenum can be incorporated as a catalyst by impregnation using ammonium salts dissolved in base. In addition, vanadium, i.e., ammonium vanadate dissolved in for example, a poly functional acid such as oxalic acid can be used. Metals such as cobalt, nickel, iron and copper can be impregnated as a nitrate solution. The impregnated supports are typically dried and sintered at elevated temperature for a time sufficient to decompose the salt to the corresponding oxide. Conventional and well known techniques can be utilized for metals such as the incorporation of precious metals as catalyst. As set forth above, a preferred impregnation technique for precious metal particularly, platinum is the use of chloro platinic acid. Aqueous and/or non-aqueous systems can be used with the medium being preferred which reduces and/or minimizes substantially deleter-ious effects on the support such as in pore size and/or surface area and/or pore size distribution. The impregnation or other techniques to incorporate a catalyst material after the formation of the tin oxide coating, is particularly preferred when the substrate is a multi-channel monolith.

The tin oxide/substrate combinations, e.g., the tin oxide coated substrates, of the present invention are useful in other applications as well. Among these other applications are included porous membranes, resistance heating elements, electrostatic dissipation elements, electromagnetic interference shielding elements, protective coatings, field dependent fluids and the like.

In one embodiment, a porous membrane is provided which comprises a porous substrate, preferably an inorganic substrate, and a tin oxide-containing material in contact with at least a portion of the porous substrate. In another embodiment, the porous membrane comprises a porous organic matrix material, e.g., a porous polymeric matrix material, and a tin oxide-containing material in contact with at least a portion of the porous organic matrix material. With the organic matrix material, the tin oxide-containing material may be present in the form of an inorganic substrate, porous or substantially non porous, having a tin oxide-containing coating, e.g., an electronically conductive tin oxide-containing coating, thereon.

One particularly useful feature of the present porous membranes is the ability to control the amount of tin oxide present to provide for enhanced performance in a specific application, e.g., a specific contacting process. For example, the thickness of the tin oxide-containing coating can be controlled to provide such enhanced performance. The coating process of the present invention is particularly advantageous in providing such controlled coating thickness. Also, the thickness of the tin oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

As set forth above, one of the preferred applications for use of the coated porous substrates is as porous membranes. Thus, the coated substrates can be controlled in the amount of tin oxide present on the outer surface versus internal surfaces to provide enhanced performance. This control is particularly useful when the porous membrane is to be used in combination with an applied force field enhance separation in various separation processes.

A heating element, for example, a resistance heating element, is provided which comprises a three dimensional substrate including a porous inorganic substrate having an electrically or electronically conductive tin oxide-containing coating on at least a portion of all three dimensions thereof. The coated substrate is adapted and structured to provide heat in response, that is, in direct or indirect response, to the presence or application of one or more force fields, for example, magnetic fields, electrical fields or potentials, combinations of such force fields and the like, therein or thereto. An example of such a heating element is one which is adapted and structured to provide heat upon the application of an electrical potential across the coated substrate. Heating elements which are adapted and structured to provide heat in response to the presence of one or more electrical currents and/or electrical fields and/or magnetic fields therein are included in the scope of the present invention. The heat may be generated resistively. As set forth above, one of the preferred coated substrates is a porous coated substrate wherein the outer surface is coated while the coating is limited in the internal surfaces. This feature is particularly useful in resistance heating applications wherein outer surface to outer surface contact between particles is used to produce heat in direct response to a field or potential. In addition, the outer coating can generate heat on the outer surface in the presence or application of one or more force fields, for example, magnetic fields and electric fields, such as, by induction heating. Thus, the controlled coating on the surface of the particles provides particularly useful advantages in heating applications and in controlling the response of the particle and/or particles to the presence or application of one or more force field. In one embodiment, a flexible heating element is provided which comprises a flexible matrix material, e.g., an organic polymeric material in contact with a substrate having an electronically conductive tin oxide-containing coating on at least a portion thereof. The coated substrate is adapted and structured as described above.

In addition, an electrostatic dissipation/electromagnetic interference shielding element is provided which comprises a three dimensional substrate, e.g., an inorganic substrate, including a porous inorganic substrate having an electronically conductive tin oxide-containing coating on at least a portion of all three dimensions thereof. The coated substrate is adapted and structured to provide at least one of the following: electrostatic dissipation and electromagnetic interference shielding. As set forth above, one of the preferred applications for use of the coated porous substrate is in static dissipation and shielding elements. Thus, the coated porous substrates can have a preferential outer surface coating while limiting the coating in the internal pore surfaces, such preferen-tial coating effectively uses the shielding, static dissipation properties of the outer surface where such outer surfaces in general contribute the major control in such static dissipation and shielding element applications.

A very useful application for the products of this invention is for static, for example, electrostatic, dissipation and shielding, particularly for ceramic and polymeric parts, and more particularly as a means for effecting static dissipation including controlled static charge and dissipation such as used in certain electro static painting processes and/or electric field absorption in parts, such as parts made of ceramics and polymers and the like, as described herein. The present products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. A particular unexpected advantage is the improved mechanical properties, especially compared to metallic additives which may compromise mechanical properties. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, i.e. particles, mats or the like, is chosen based upon the particular requirements of the part and its application, with one or more of flakes, i.e. platelets, fibers and particles, including spheres, being preferred for polymeric parts. In general, it is preferred that the products of the invention have a largest dimension, for example, the length of fiber or particle or side of a flake, of less than about ⅛ inch, more preferably less than about 1/64 inch and still more preferably less than about 1/128 inch. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials. A further advantage of the above products is their ability to provide static dissipation and/or shielding in adverse environments such as in corrosive water and/or electro galvanic environments. As noted above, the products have the ability to absorb as well as to reflect electro fields. The unique ability of the products to absorb allows parts to be designed which can minimize the amount of reflected electro fields that is given off by the part. This latter property is particularly important where the reflected fields can adversely affect performance of the part.

A flexible electrostatic dissipation/electro-magnetic interference shielding element is also included in the scope of the present invention. This flexible element comprises a flexible matrix material, e.g., an organic polymeric material, in contact with a substrate having an electronically conductive tin oxide-containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation or electromagnetic interference shielding application.

The present tin oxide/substrate combinations and matrix material/tin oxide/substrate combinations, which have at least some degree of porosity, hereinafter referred to as "porous contacting membranes" or "porous membranes", may be employed as active components and/or as supports for active components in systems in which the tin oxide/substrate, e.g., the tin oxide coated substrate, is contacted with one or more other components such as in, for example, separation systems, gas purification systems, filter medium systems, flocculent systems and other systems in which the stability and durability of such combinations can be advantageously utilized.

Particular applications which combine many of the outstanding properties of the products of the present invention include porous and electro membrane separations for gas processing, food processing, textile/leather processing, chemical processing, bio medical processing and water treatment. For example, various types of solutions can be further concentrated, e.g., latex concentrated, proteins isolated, colloids removed, salts removed, etc. The membranes can be used in flat plate, tubular and/or spiral wound system design. In addition, the products of this invention can be used e.g., as polymeric composites, for electromagnetic and electrostatic interference shielding applications used for computers, telecommunications and electronic assemblies, as well as in low radar observable systems and static dissipation, for example, in carpeting and in lightening protection systems for aircraft.

Membranes containing voids that are large in comparison with molecular dimensions are considered porous. In these porous membranes, the pores are interconnected, and the membrane may comprise only a few percent of the total volume. Transport, whether driven by pressure, concentration, or electrical potential or field, occurs within these pores. Many of the transport characteristics of porous membranes are determined by the pore structure, with selectivity being governed primarily by the relative size of the molecules or particles involved in a particular application compared to the membrane pores. Mechanical properties and chemical resistance are greatly affected by the nature, composition and structure e.g., chemical composition and physical state, of the membrane.

Commercial micropore membranes have pore dimensions, e.g., diameters, in the range of about 0.005 micron to about 20 microns. They are made from a wide variety of materials in order to provide a range of chemical and solvent resistances. Some are fiber or fabric reinforced to obtain the required mechanical rigidity and strength. The operational characteristics of the membrane are defined sometimes in terms of the molecules or particles that will pass through the membrane pore structure.

Microporous membranes are often used as filters. Those with relatively large pores are used in separating coarse disperse, suspended substances, such as particulate contamination. Membranes with smaller pores are used for sterile filtration of gases, separation of aerosols, and sterile filtration of pharmaceutical, biological, and heat sensitive solutions. The very finest membranes may be used to separate, e.g., purify, soluble macromolecular compounds.

Porous membranes also are used in dialysis applications such a removing waste from human blood (hemodialysis), for separation of biopolymers, e.g., with molecular weights in the range of about 10,000 to about 100,000, and for the analytical measurements of polymer molecular weights. Microporous membranes also may be used as supports for very thin, dense skins or a containers for liquid membranes.

The ability of dense membranes to transport species selectively makes possible molecular separation processes such as desalination of water or gas purification, but with normal thicknesses these rates are extremely slow. In principle, the membranes could be made thin enough that the rates would be attractive, but such thin membranes would be very difficult to form and to handle, and they would have difficulty supporting the stresses imposed by the application. Conversely, microporous membranes have high transport rates but very poor selectivity for small molecules. Asymmetric membranes, for example made of the present combinations, in which a very thin, dense membrane is placed in series with a porous substructure are durable and provide high rates with high selectivity. Such asymmetric membranes and the use thereof are within the scope of the present invention.

Examples of applications for porous membranes include: separation of fungal biomass in tertiary oil recovery; concentration of PVC latex dispersions; desalination of sea water; enhancement of catecholamine determination; removal of colloids from high purity deionized water; treatment of wool scouring liquids; filtration of tissue homogenates; separation of antigen from antigen-antibody couple in immunoassay; purification of subcutaneous tissue liquid extracts; concentration of solubilized proteins and other cellular products; cell debris removal; concentration of microbial suspensions (microbial harvesting); enzyme recovery; hemodialysis; removal of casein, fats and lactose from whey; concentration of albumen; separation of skimmed milk; clarification of liqueur, fruit juices, sugar, and corn syrup; alcohol fermentation; sterilization of liquids, e.g., beer, wine; continuous microfiltration of vinegar; concentration and demineralization of cheese, whey, soy whey, vegetable extracts, and flavorings; sugar waste recovery; silver recovery from photo rinses; dewatering of hazardous wastes; removal of hydrocarbon oils from waste water; recovery and recycling of sewage effluent; recovery of dye stuffs from textile mill wastes; recovery of starch and proteins from factory waste, wood pulp, and paper processing; separation of water and oil emulsions; separation of carbon dioxide and methane; and catalytic chemical reactions.

As described above porous membranes can be used in a wide variety of contacting systems. In a number of applications, the porous membrane provides one or more process functions including: filtration, separation, purification, recovery of one or more components, emulsion breaking, demisting, flocculation, resistance heating and chemical reaction (catalytic or non- catalytic), e.g., pollutant destruction to a non-hazardous form. The resistance heating and chemical reaction functions (applications) set forth herein can be combined with one or more other functions set forth herein for the porous membranes as well as such other related porous membrane applications.

The porous membrane, in particular the substrate, can be predominantly organic or inorganic, with an inorganic substrate being suitable for demanding process environments. The porous organic-containing membranes often include a porous organic based polymer matrix material having incorporated therein a three dimensional tin oxide-containing material, preferably including an electronically conductive tin dioxide coating, more preferably incorporating a dopant and/or a catalytic species in an amount that provides the desired function, particularly electrical conductivity, without substantially deleteriously affecting the properties of the organic polymer matrix material. These modified polymer membranes are particularly useful in porous membrane and/or electromembrane and/or catalytic processes.

Examples of polymer materials useful in microporous membranes include cellulose esters, poly(vinyl chloride), high temperature aromatic polymers, polytetrafluoroethylene, polymers sold by E. I. DuPont Corporation under the trademark Nation, polyethylene, polypropylene, polystyrene, polyethylene, polycarbonate, nylon, silicone rubber, and asymmetric coated polysulfone fiber.

A very convenient application for the coating process and products of this invention is the production of a controlled coating, e.g., a thin coating of tin oxide-containing material, on an inorganic substrate, particularly a porous inorganic substrate, to produce a porous membrane. The process provides a new generation of membranes: porous membranes for contacting processes, e.g., as described herein. The selectively in filtration, particularly ultra and micro filtration, can also be enhanced by applying an electrical field and/or an electrical potential to the porous membrane. The electrical field and/or potential can be obtained using a two electrode electrical system, the membrane including a electronically conductive tin oxide-containing coating constituting one of the two electrodes (anode or cathode).

Porous multilayer asymmetric electronically conductive inorganic membranes, produced in accordance with this invention, are particularly advantageous for membrane applications. Among the advantages of such membranes are: stability at high temperature and/or at large pressure gradients, mechanical stability i.e. reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

A membrane can be classified as a function of the size of the particles, macromolecules and molecules separated. Micron sized porous ceramics for filtration processes can be prepared through sintering of appropriate materials as set forth herein for the manufacture of sensors. However, the preferred process for membrane-based microfiltration, ultrafiltration and reverse osmosis is to provide inorganic layers with ultrafine pores and thickness small enough to obtain high flux through the membrane, particularly membranes including tin oxide-containing coatings.

With this type of asymmetric membrane, separation processes are pressure driven. Another factor is the interaction at the membrane interface between the porous material and the material to be processed. As noted above, selectivity can be enhanced by applying an electrical field onto the surface of the membrane. The electrical field is obtained using a two electrode electrical device; the conductive membrane constituting one of the two electrodes (anode or cathode—preferably anode). Such porous membranes can e obtained with one or more electronically conductive tin oxide-containing thin layers on a porous substrate. Conductive tin oxide combined with other metal oxide mixtures also provide improved properties for porous membranes and exhibit electronic conductivity, as well as other functions, such as catalysts or resistance heating.

The products of this invention as described herein, are particularly useful for resistance heating applications. It has been found that the coated three dimensional and/or flexible substrates particularly fibers, fiber rovings, chopped fibers, and fiber mats, and flakes and other particles can be incorporated into polymeric matrix materials, particularly thermoplastic, thermoset and rubber based polymeric materials, as describe herein. The tin oxide coated substrates, particularly porous particles can be, for example, E, C, S, or T glass, silica, silica alumina, silica alumina boria, silicon carbide or alumina fibers, rovings, mats, chopped mats, other particles, as set forth above etc. What is unexpected is the improved mechanical properties, e.g., strength coating adhesion and the like, of the coated substrates relative to the prior art substrates coated using spray pyrolysis techniques and the improved control over coating thickness to match conductivity requirements for a given resistance heating application. Whereas for many low to moderate temperature applications, organic polymer matrix materials are preferred, three dimensional products comprising, preferably primarily comprising flexible or rigid inorganic substrates coated with tin oxide-containing coatings have excellent high temperature performance characteristics useful, for example, in high temperature resistance heating of liquids and gases, such as air, by contact with or through (i.e., porous) such three dimensional products. Typical resistance heating applications include: heating elements or units of electric heating devices, devices for culinary purposes, warming tables, therapeutic heaters, deicing devices such as electrically heated polymer composites, low-temperature ovens such as driers, high temperature heating of gases, liquids, etc.

Another very useful application for the products of this invention is for the joining of parts, particularly polymeric parts, and as a means for effecting the sintering or curing of parts, such as ceramics, curable polymers, for example thermoset and rubber based polymers and the like. The products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be joined and resistance heating particularly induction heating used to raise the temperature and bond the parts together at a joint such as through polymer melting and/or curing. A particular unexpected advantage is the improved mechanical properties, especially compared to metallic susceptors which may compromise mechanical properties. In addition, the products of this invention can be used in molding processes to preferentially allow the rapid heating and curing of polymeric resins, and/or to have a preferential distribution of the products at the surface of the parts for subsequent joining of parts. The particular form of the products, i.e., fibers, flakes, spheres, particles, mats or the like, is chosen based upon the particular requirements of the part and its application, with one or more of flakes, fibers and particles being preferred for joining or bonding parts. In general, it is preferred that the products of the invention have a largest dimension, for example the length of a fiber or side of a flake, of less than about 1/8 inch, more preferably less than about 1/64 inch and still more preferably less than about 1/128 inch. The concentration of such product or products in the product/carrier and/or mix is preferably less than about 50 weight %, more preferably less than about 20 weight %, and still more preferably less than about 10 weight %. A particularly useful concentration is that which provides the desired heating while minimizing the concentration of product in the final part.

As set forth above, the coated porous substrates are particularly useful in applications where such coated substrates becomes part of a matrix material, particularly a polymeric matrix material. Thus, for example, the coated substrates can be incorporated into a polymer matrix for use in, for example, bipolar batteries, resistance heating polymer products, porous membranes and shielding dissipation products. In a number of the preferred applications for use of the coated substrate in polymer matrices, the outer surface coating performs the major intended function such as, for example, surface to surface contact to form an electrical circuit and/or to be responsive to a force field and/or to reflect and/or absorb a particular wave form such as in shielding applications. In such applications, the internal porosity can reduce the weight of the polymer matrix product in comparison to a solid, coated particle, and in addition, the porosity and surface area allows for improved bonding of the polymer matrix to the particle. Such polymer matrices containing coated porous substrates, have improved mechanical structural properties, as well as improved properties relating to the functioning of the conductive outer surface of tin oxide.

Another unique application of the present invention combines the stability of the tin oxide containing coating, particularly at high temperatures and/or in demanding oxidizing environments, with the need to protect a structural element and/or to provide a fluid, i.e., gas or liquid, impervious material. Such structural elements are suitable for use at high temperatures, preferably greater than about 400° F., more preferably greater than about 1500° F. or even greater than about 2000° F. The present coatings preferably provide protection against oxidation. Examples of structural elements requiring such protection and/or a fluid impervious coating include three dimensional substantially carbon or inorganic materials, such as woven ceramic fibers and carbon-carbon composites, useful as turbine engine components, hot air frame components, and hypersonic vehicle structural elements or components. Due to the fact that carbon oxidizes under the demands of such environments, barrier or protective coatings are necessary. A particularly effective barrier coating is a tin oxide-containing coating formed according to the present invention because of the high temperature stability and excellent and complete coverage of such coating.

In addition, it is believed that a layer of at least one lower valence oxide of tin may form at the carbon tin oxide interface thereby giving additional barrier protection against excessive carbon oxidation to carbon oxides gases and decomposition products. The coating process of this invention, in addition, can uniformly coat three dimensional woven structures, particularly in the vaporous state, to effectively seal off diffusion of gases and/or liquids between surfaces. For example, ceramic fibers, such as those sold under the trademark Nextel by the 3M Company, can be woven into structures or structural elements, sealed off between surfaces, and used in high temperature applications. Such applications include gas and/or oil radiant and post combustion burner tubes, turbine engine components, and combustion chambers. For the latter, such structures can also contain one or more catalytically active materials that promote combustion, such as hydrocarbon combustions.

A particularly unique application that relies upon stable electronic conductivity and the physical durability of the products of this invention are dispersions of conductive material, such as powders, in fluids, e.g., water, hydrocarbons, e.g., mineral or synthetic oils, whereby an increase in viscosity, to even solidification, is obtained when an electrical field is applied to the system. These fluids are referred to as "field dependent" fluids which congeal and which can withstand forces of shear, tension and compression. These fluids revert to a liquid state when the electric field is turned off. Applications include dampening, e.g., shock absorbers, variable speed transmissions, clutch mechanisms, etc.

The products of this invention which are particularly useful for forming field dependent fluids are particulate as set forth above, particularly porous particulate, particularly as powders. Such particulate can be for example, spheres, fibers, flakes, i.e. platelets, and such other particulates, and powders. Typical examples of such tin oxide coated particles are the set forth above under catalysts, resistance heating and electrostatic and EMI shielding particles. Such particles can have incorporated therein various dopants to modify conductivity and/or other components can be incorporated for a particular property, including various metal type components. In addition, various inorganic substrates are set forth above which substrates are particularly useful in producing the particles for use in field dependent fluids.

The coated substrate including the tin dioxide, preferably electrorheology electronically conductive tin dioxide, and/or optionally, electrorheology polarizable tin dioxide and/or at least one additional component in an amount effective to promote field dependent fluid performance, is particularly useful as field dependent fluids including electric and magnetic field dependence, particularly electric field. Preferably the additional component is a polarizable component or conductivity modified in an amount effective to promote such fluid performance. Thus the promoting effect of the component may be enhanced by the presence of an electrical field in proximity to the component/particle. Thus, the tin dioxide, preferably on a substantially non-electronically conductive substrate, eg., a particle, can provide an effective and efficient electric field dependent fluid, including those which occur or are enhanced when an electric field is applied in proximity to the particle. Thus, it has been found that the presently coated substrates are useful as active electrorheological fluid enhancers and as a base modified by additional components that still further enhance electrorheological fluid properties. Without wishing to limit the invention to any particular theory of operation, it is believed that the outstanding stability, e.g., with respect to electronic properties and/or morphology and/or stability, of the present tin oxides plays an important role in making useful and effective field dependent particles, particularly the higher surface area attainable tin dioxide particles, particularly when prepared in accordance with this invention.

As noted above, it is preferred that the tin oxide particle, tin oxide-containing substrates be electronically conductive and/or polarizable. Although fluorine doped tin oxide is particularly useful, other dopants may be incorporated in the present particle to provide the tin oxide with the desired electronic and/or polarizable properties. For example, antimony may be employed as a tin oxide dopant. Such other dopants may be incorporated into the final particle, tin oxide-containing coated substrates using one or more processing techniques substantially analogous to procedures useful to incorporate fluorine dopant, e.g., as described herein.

As set forth above, the tin dioxide particles is present in the fluid in the amount to enhance the field dependent fluid performance. In addition the conductivity and/or reciprocal resistivity of the tin dioxide particle is of a value which promotes the overall performance of the field dependent fluid, i.e., enhances electrorheological properties of the fluid. Typically the resistivity of the tin dioxide particle is within the range from about $10^{-3}$ to about $10^9$ ohm cm, more preferably from about $10^1$ to about $10^3$ ohm cm and still more preferably, from about 10 ohm cm to about $10^2$ ohm cm. The conductivity of the tin dioxide particle can be controlled by the type of dopant, the concentration of dopant, the processing conditions in order to obtain a resistivity within the preferred ranges as set forth above and with improved electrorheological modifying properties. In addition to the above modifications to obtain a given conductivity other components can be incorporated into the tin oxide coating such as a moderate to high resistance type of material such as silica which produces a tin dioxide coating having optimized electrorheological properties.

In addition to electrical conductivity as set forth above, the polarizability of the tin dioxide coating can be modified through the addition of a component such as to enhance the overall polarizability of the tin dioxide particle which enhanced polarizability can improve the overall electrorheological properties of the fluid. For example, the tin dioxide coating can be modified to form surface hydrates which are responsive to electric fields and produce a reversible change in electrorheological properties. Other components, particularly polar components, more particularly organic polar components such as surface active agents, alkanol amines such as low molecular weight alkanol amines, alkyl amines and water can in addition be used as polarization components. Such additional components which alter the polarization properties of the tin dioxide coating and can produce field dependent fluids which are useful at elevated temperatures, including for certain fluids use above 70° C. or even above 100° C. The stability and durability for the present tin oxide materials are believed to make them very useful in field dependent fluids in more aggressive and/or more harsh environments, particularly high temperature, and/or pressure and/or oxidation environments.

Certain metal components associated with the tin oxide particle may be employed, provided that they function to enhance electrorheological properties and/or an application defined property. Among the useful metal components are those selected from components of the transition metals, the rare earth metals, certain other components and mixtures thereof, in particular, gold, silver, copper, vanadium, chromium, cobalt molybdenum, tungsten zinc, indium, the platinum group metals, i.e., platinum, palladium and thorium, iron, nickel, manganese, cesium, titanium, etc. Although metal containing compounds may be employed, it is preferred that the metal components included with the coated substrate comprise elemental metal and/or metal in one or more active oxidized forms, for example, $Cr_2O_3$, $Ag_2O$, etc.

The preferred substrate materials include a wide variety of inorganic materials including high surface area materials, particularly inorganic oxides and carbon as set forth above, particularly under the catalysts, resistance heating and shielding products of this invention. Additional substrates include for example, alumina, silica, zirconia, magnesia, boria, phosphate, titania, ceria, thoria and the like, as well as multi-oxide type supports such as alumina-phosphorous oxide, silica alumina, zeolites, zeolite modified inorganic oxides, e.g., silica alumina and the like. As set forth above, substrate particle materials can be in many forms and shapes, especially shapes which are not flat surfaces, i.e., non line-of-site particulate materials and particularly, spheres. The substrate can be used as is or further processed such as by sintering of powered materials into large aggregates. The aggregates can incorporate other powders, for example, other oxides, to form the aggregates.

As set forth above, the particles include for example, spheres, fibers, flakes, other irregularly shaped geometry such as aggregates and alike. In general the particle size can vary over a wide range, typically a particle size maximum width of from about 0.04 microns up to a width representing about 10% of the design gap between electrodes which form the electric field means associated with the use of the field dependent fluid. More preferably, the range of the width of the particle is from about 1 to about 100 microns still more preferably, from about 5 to about 50 microns. The width of the particles can be adjusted to provide various degrees of packing densities in the fluid which packing densities can include a bi-modal type of distribution of particle sizes.

It is preferred that the particles comprise a majority of mono particles, more preferably, a predominant proportion. The use of mono particles reduces the tendency of the particles to sheer down to smaller size particles which shear down may accompany the use of particle aggregates in field dependent fluids. In addition, it is preferred to have a particle aspect ratio, i.e., the maximum particle width divided by the minimum particle width of less than about 20 to 1, still more preferably less than about 10 to 1 and still more preferably, less than about 5 to 1. One of the preferred shapes is spheres and/or beads wherein the aspect ratio approaches 1 and/or is 1. In practice the spherical particles which are preferred for use in the composition of this invention, have a roundness associated with such particles generally greater than about 70%, still more preferably greater than about 85% and still more preferably, greater than about 95%.

As set forth above, a particularly preferred particle is a spherical particle, particularly spheres within the particle size and roundness ranges set forth above. The spheres can improve overall field dependent fluid performance, particularly in reducing adverse particle effects on the fluid such as dielectric breakdown. A particularly unique embodiment of the present invention is the use of hollow spheres, particularly within the particle size and roundness ranges as set forth above. Such spheres are hollow i.e. contain one or more closed cell voids hereinafter referred to as hollow spheres and are designed to be density compatible with the fluid. The density compatible hollow spheres have a density in the range of from about 60% to about 140% of the density of the fluid, more preferably from about 70% to about 130% of the density of the fluid, still more preferably from about 80% to about 120% of the density of the fluid and still more preferably, from about 90% to about 110% of the density of the fluid. Thus, for example, the density of the fluid can vary according to the type of fluid utilized in the field dependent fluid, such as from about 0.95 g per cc up to about 1.95 g per cc for certain chlorinated aromatic fluids. The density compatibility of the hollow spheres relates to the particular fluid, including blends of fluids utilized as the field dependent fluid. The density compatibility provides improved stability of the hollow spheres particulate in the fluid, particularly where settling out the particles can adversely effect overall performance of the field dependent fluids and/or where such sedimentation can cause premature failure of the device.

As set forth above, the spheres can be inorganic and for example, carbon and/or inorganic oxide. The preferred inorganic oxides can be for example alumino silicates, silica, sodium borosilicate, insoluble glass, soda lime glass, soda lime borosilicate glass, silica alumina, as well as such glasses and ceramics, modified with titanium dioxide and/or small amounts of iron oxide. The density of the hollow spheres can be designed to be density compatible with the fluid by the density of the inorganic material itself, the hollow and or void volume and the thickness of the wall and the density of surface component on the sphere. For a hollow sphere the aspect ratio, i.e., the diameter of the sphere divided by the thickness of the wall, in part defines both the density of the hollow sphere, as well as the buckling pressure of the sphere. Thus as the aspect ratio decreases, the density of the hollow sphere increases and in general, the crush strength of the hollow sphere increases. Of additional significance is the ability of the hollow sphere under high sheer conditions to provide improved mechanical stability, particularly at aspect ratios which provide the requisite wall thickness and density compatibility. Thus for example, hollow spheres for use in field dependent fluids can be designed for density compatibility at high crush strengths and sheer rates, for example, less than about 20% and even less than about 10% breakage at isostatic pressures of greater than 6,000 psi, even up to about 60,000 psi.

As set forth above, the unique hollow spheres having fluid density compatibility can be coated with tin dioxide including such additional components as set forth above. In addition, it has been found that the fluid density designed particles can improve the overall performance of materials that have been shown to exhibit an electrorheological effect. Thus for example, fluid density compatible hollow spheres can have an electronically conductive and/or polarizable surface component associated therewith, including components which are incorporated during the processing to produce such fluid density compatible materials. For example, alumino silicates, organic polyelectro-lytes, organic polyampholytes, organic semiconductors, water, polar organic compounds such as alcohols, amines, amides, polyhydroxy organic compounds and various other surfactant materials which provide a polarizable effect on the surface can be incorporated on the surface of the hollow sphere.

The surface area can be optimized for the tin oxide coating and/or other components, and/or other conductivity and/or polarizable components, by the selection of starting materials, porosity forming components and their concentration and geometry. Such optimization also takes into consideration the final end use application of the substrate. Porosity can also be increased by directly leaching the preformed substrate within an acid medium, i.e., nitric acid, to selectively remove for example ceramic constituents for example magnesia and alumina. Such leaching cannot only increase porosity but also the surface areas of the substrate. Typical substrate surface areas can be as set forth above. In addition, such ranges can vary from about 0.1 to about 2 meters square per gram up to about 20 or even up to about 40 or higher meters square per gram, with the higher areas generally resulting from leached and/or coated and/or formed porous substrates.

It is generally preferred to have a high surface area in order to optimize activity for a particular application. As set forth above, the surface area can be increased by, for example, leaching and/or by the application of a surface coating such as a wash-coat which provides for a high surface area surface on the substrate and/or by forming the high surface area substrate. It is preferred to incorporate other active components as set forth above on a high surface area for improved overall effectiveness and activity. As set forth above, it is preferred to have macro pores when a subsequent surface coat is being applied to the substrate. Such subsequent coatings can include, for example, a barrier coat, a wash coat, and/or the tin oxide coating on the substrate surface.

Other active components may be included with the coated substrate and/or substrate using any one or more of various techniques, e.g., conventional and well known techniques. For example, metal can be included with the coated substrate by impregnation; electro-chemical deposition; spray hydrolysis; deposition from a molten salt mixture; thermal decomposition of a metal compound or the like. The amount of a component included is sufficient to perform the desired functions, and varies from application to application.

Certain of these and other aspects the present invention are set forth in the following description of the accompanying drawing.

BRIEF DESCRIPTION OF THE DRAWING

The FIGURE is a block flow diagram illustrating a process for producing certain of the present coated substrates.

DETAILED DESCRIPTION OF THE DRAWING

The following description specifically involves the coating of randomly oriented, woven mats of C-glass fibers. However, it should be noted that substantially the same process steps can be used to coat other substrate forms and/or materials.

A process system according to the present invention, shown generally at 10, includes a preheat section 12, a coating section 14, an equilibration section 16 and an oxidation/sintering section 18, each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment. First exhaust 24 and second exhaust 26 are provided to allow vapors to exit or be vented from process system 10.

Randomly oriented woven mats of C-glass fibers from substrate source 28 is fed to preheat section 12 where the mats are preheated up to a maximum of 375° C. for a time of 1 to 3 minutes at atmospheric pressure to reach thermal equilibrium. These mats are composed of from 8 micron to 35 micron diameter C- or T-glass randomly oriented or woven fibers. The mats are up to 42 inches wide and between 0.058 to 0.174 mil thick. The mats are fed to process system 10 at the rate of about 1 to 5 feet per minute so that the fiber weight through is about 0.141 to about 2.1 pounds per minute.

The preheated mats pass to the coating section 14 where the mats are contacted with an hydrous mixture of 70% to 95% by weight of stannous chloride and 5% to 30% by weight of stannous fluoride from raw material source 30. This contacting effects a coating of this mixture on the mats.

This contacting may occur in a number of different ways. For example, the $SnCl_2/SnF_2$ mixture can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of $SnCl_2$ and $SnF_2$ to condense on and coat the mats.

Another approach is to apply the $SnCl_2/SnF_2$ mixture in a molten form directly to the mats in an inert atmosphere. There are several alternatives for continuously applying the molten mixture to the mats. Obtaining substantially uniform distribution of the mixture on the mats ia a key objective. For example, the mats can be compressed between two fillers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $SnCl_2/SnFn_2$ in an organic solvent. The solvent is then evaporated, leaving a substantially uniform coating of $SnCl_2/SnF_2$ on the fiber mats. The solvent needs to be substantially none-reactive (at the conditions of the present process) and provide for substantial solubility of $SnCl_2$ and $SnF_2$. For example, the dipping solution involved should preferably be at least about 0.1 molar in $SnCl_2/SnF_2$. Substantially anhydrous solvents comprising acetonitrile, ethyl acetate, dimethyl sulfoxide, propylene carbonate and mixtures thereof are suitable. Stannous fluoride is often less soluble in organic solvents than is stannous chloride. One approach to overcoming this relative insolubility of $SnF_2$ is to introduce $SnF_2$ onto the fiber mats after the fiber mats are dipped into the $SnCl_2$ solution with organic solvent. Although the dopant may be introduced in the sintering section 18, it is preferred to incorporate the dopant in the coating section 14 or the equilibration section 16, more preferably the coating section 14.

Any part of process system 10 that is exposed to $SnCl_2$ and/or $SnF_2$ melt or vapor is preferably corrosion resistant, more preferably lined with inert refractory material.

In any event, the mats in the coating section 14 are at a temperature of up to about 375° C., and this section is operated at slightly less than atmospheric pressure. If the $SnCl_2/SnF_2$ coating is applied as a molten melt between compression rollers, it is preferred that such compression rollers remain in contact with the fiber mats for about 0.1 to about 2 minutes, more preferably about 1 to about 2 minutes.

After the $SnCl_2/SnF_2$ coating is applied to the fiber mats, the fiber mats are passed to the equilibration section 16. Here, the coated fiber mats are maintained, preferably at a higher temperature than in coating section 14, in a substantially inert atmosphere for a period of time, preferably up to about 10 minutes, to allow the coating to more uniformly distribute over the fibers. In addition, if the fluorine component is introduced onto the fiber mats separate from the stannous chloride, the time the coated fiber mats spend in the equilibration section 16 results in the dopant component becoming more uniformly dispersed or distributed throughout the stannous chloride coating. Further, it is preferred that any vapor and/or liquid which separate from the coated fiber mats in the equilibration section 16 be transferred back and used in the coating section 14. This preferred option, illustrated schematically in FIG. 1 by lines 32 (for the vapor) and 34 (for the liquid) increases the effective overall utilization of $SnCl_2$ and $SnF_2$ in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and water vapor. This mixture, which preferably includes about 1% to about 50% m more preferably about 15% to about 35%, by weight of water, is contacted with the coated fiber mats at atmospheric pressure at a temperature of about 400° C. to about 550° C. for up to about 10 minutes. Such contacting results in converting the coating on the fiber mats to a fluorine doped tin dioxide coating. The fluorine doped tin oxide coated fiber mats product, which exits sintering section 18 via line 38, has useful electric conductivity properties. This product preferably has a doped tin oxide coating having a thickness in the range of about 0.5 microns to about 1 micron, and is particularly useful as a component in a lead-acid battery. Preferably, the product is substantially free of metals contamination which is detrimental to electrical conductivity.

The present process provides substantial benefits. For example, the product obtained has a fluorine doped tin oxide coating which has useful properties, e.g., outstanding electrical and/or morphological properties. This product may be employed in a lead-acid battery or in combination with a metallic catalyst to promote chemical reactions, e.g., chemical reductions, or alone or in combination with a metallic sensing component to provide sensors, e.g., gas sensors. High utilization of stannous chloride and fluorine components is achieved. In addition, high coating deposition and product throughout rates are obtained. Moreover, relatively mild conditions are employed. For example, temperatures within sintering section 19 can be significantly less than 600° C. The product obtained has excellent stability and durability.

EXAMPLE 1

A randomly oriented mat substrate made of C-glass was contacted with a molten mixture containing 30 mol % $SnF_2$ and 70 mol % $SnCl_2$. This contacting occurred at 350° C. in an argon atmosphere at about atmospheric pressure and resulted in a coating containing $SnCl_2$ and $SnF_2$ being placed on the substrate.

This coated substrate was then heated to 375° C. and allowed to stand in an argon atmosphere at about atmospheric pressure for about 5 minutes. The coated substrate was then fired at 500° C. for 20 minutes using flowing, at the rate of one (1) liter per minute, water saturated air at about atmospheric pressure. This resulted in a substrate having a fluorine doped tin oxide coating with excellent electronic properties. For example, the volume resistivity of this material was determined to be $7.5 \times 10^{-4}$ ohm-cm.

In the previously noted publication "Preparation of Thick Crystalline Films of Tin Oxide and Porous Glass Partially Filled with Tin Oxide," an attempt to produce antimony doped tin oxide films on a 96% silica glass substrate involving stannous chloride oxidation at anhydrous conditions resulted in a material having a volume resistivity of $1.5 \times 10^{-7}$ ohm-cm.

The present methods and products, illustrated above, provide outstanding advantages. For example, the fluorine doped tin oxide coated substrate prepared in accordance with the present invention has improved, i.e., reduced, electronic resistivity, relative to substrates produced by prior methods.

EXAMPLE 2

Stannous chloride powder is applied to a 26 inches by 26 inch glass fiber non woven mat in the form of a powder (10 to 125 microns in average particle diameter) shaken from a powder spreading apparatus positioned 2 to about 5 feet above the mat. An amount of stannous fluorine powder (10 to about 125 microns in average particle diameter) is added directly to the stannous chloride powder to provide fluoride dopant for the final tin oxide product. The preferred range to achieve low resistance tin oxide products is about 15% to about 20% by weight of stannous fluoride, based on the total weight of the powder. The powder-containing mat is placed into a coating furnace chamber at 350° C. and maintained at this temperature for approximately 20 minutes. During this time a downflow of 9.0 liters per minute of nitrogen heated to 350° C. to 350° C. is maintained in the chamber.

In the coating chamber the stannous chloride powder melts and wicks along the fiber to from a uniform coating. In addition, a small cloud of stannous chloride vapor can form above the mat. This is due to a small refluxing action in which hot stannous chloride vapors rise slightly and are then forced back down into the mat for coating and distribution by the nitrogen downflow. This wicking and/or refluxing is believed to aid in the uniform distribution of stannous chloride in the coating chamber.

The mat is then moved into the oxidation chamber. The oxidation step occurs in a molecular oxygen-containing atmosphere at a temperature of 525° C. for a period of time of 10 to 20 minutes. The mat may be coated by this process more than once to achieve thicker coatings.

EXAMPLE 3

Example 2 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 4

Example 2 is repeated except that the powder is applied to the mat by pulling the mat through a fluidized bed of the powder, which is an average particle diameter of about 5 to about 125 microns.

EXAMPLE 5 to 7

Examples 2, 3 and 4 are repeated except that, prior to contacting with the powder, the mat is charged by passing electrostatically charged air over the mat. The powder particles are charged with an opposite charge to that of the mat. The use of oppositely charged mat and powder acts to assist or enhance the adherence of the powder to the mat.

EXAMPLES 8 TO 13

Examples 2 to 7 are repeated except that no stannous fluoride is included in the powder. Instead, hydrogen fluoride gas is included in the downflow nitrogen gas in the chamber. The preferred weight ratio of tin to fluoride fed to the chamber to achieve low resistance tin oxide products is in the range of about 0.05 to about 0.2.

EXAMPLES 14 TO 16

Examples 3, 6, and 9 are repeated except that an alumina porous substrate having an average particle thickness of 120 microns is incorporated into the powder composition at a concentration of about 30 wt %. Prior to processing the mat in the equilibration and oxidation section of the reactor, a second mat was placed underneath the coated mat. The temperature of the equilibration section of the reactor was at 450° C. and the oxidation section was at 550° C. The atmospheres in each section are as set forth in Example 1. The powder coated porous substrate and top and bottom mats is moved into the equilibration section for a time of about 5–20 seconds. The powder melts on the outer surfaces of the porous substrate with controlled coating in the macro pores of the porous substrate. The particles and mats are transferred rapidly to the oxidation section, i.e. less than 1 second and the mats and coated substrates are contacted with the oxygen water/vapor mixture. After processing the particulate material incorporated as part of the powder is removed from the top and bottom mats and is found to have a thin, less than 0.3 micron, uniform coatings of tin dioxide on the complete particle surface.

EXAMPLE 17

Example 14 is repeated except that a porous silica bead having a bead diameter of 90 microns, a surface area of 440$M^2$/g, a pore volume of 3.1 (cc/g) and a pore diameter of 280 angstroms is substituted for the porous alumina substrate.

EXAMPLE 18

Example 17 is repeated except that a porous silica extrudate having a particle size of 1/64", a surface area of 300$M^2$/g, a pore volume of 1.0 cc/g and a pore diameter of 133 angstroms is substituted for the silica bead.

In each of the Examples 2 to 19, the final coated product includes an effectively fluoride doped tin oxide-containing outside surface coating having a substantial degree of uniformity and a limited coating on the internal pore surfaces.

The above examples set forth the significant process and products advancements through the practice of this invention. The following examples and processing results as set forth were obtained when a substrate mat of example 1 was substituted in state of the art equipment used for the processing of flat types of substrate, particularly flat glass.

EXAMPLE 19

Example 17 is repeated except that a porous alumina substrate having a mean macro pore size of 45 microns, an apparent porosity of 59%, a surface area of 0.3$M^2$/g and a bulk density of 1.4 is substituted for the silica substrate.

EXAMPLE 20

A commercial spray pyrolysis process unit was used to compare the processing of a flat glass soda lime substrate with the processing of a non-woven porous mat of the type set forth in example 1. The spray pyrolysis unit had a process capability to coat a flat glass having a dimension of from 3 feet in width to 5 feet in length. In the unit a solution composition was atomized and sprayed directly at the surface. The temperature of the substrate was obtained by placing the substrate within an electrically heated furnace. The substrate was then removed from the furnace and immediately contacted with the atomized solution spray. The deposition parameters were as follows: temperature 500° C., gas delivery pressure solution 30 psi, compressed air 40–60 psi, spray configuration—round spray, vertical deposition, final coat distance—16" to 18", solution feed rate—5–20 ml per minute, spraying time 30–60 seconds. The spray solution contained 50% stannic chloride, deionized water, methanol and hydrofluoric acid (48 wt %) in a ratio of about 1 to 1 to 1 to 0.1. The following results were obtained from the processing of a flat soda lime glass, and a non-woven C glass mat having a thickness of about 0.65", a dimension of 16"×16" and a bulk porosity of about 90%. Each substrate was processed according to the above conditions and after processing it was determined that the flat glass had a resistivity of 10 ohms per square while the C glass mat had no evidence of a coating. The process was repeated except that that mat was placed in front of the flat glass. After processing, there was no evidence of coating on the C glass mat. However, the backside flat glass had a conductive coating. Following the failure to coat the glass mat, using state of the art, spray pyrolysis technology, the process unit was modified by placing a 1" thick stainless steel plate on which to vertically mount the C glass mat. The mat after processing with the 1" stainless steel backing produced a resistivity of 600–800 ohms per square on the inner surface of the mat. The process unit was again modified to place mesh screens over the front of the mat, accompanied by bolting of the screens to the back of the stainless steel plate. The results of the combination of steel plate and mesh plate over the front of the mat was a mat conductivity of 5–6 ohms per square. However, the mesh plate obstructed the contact of the spray solution with the mesh underlying portions of the glass mat. In order to achieve a conductivity of 5–6 ohms per square, 20 coatings on both the front and back sides were required. The modifications made to the state of the art process unit, were not available in the prior art.

EXAMPLE 21

A horizontal continuous chemical vapor deposition (CVD) furnace manufactured by Watkins-Johnson was evaluated for the coating of the non-woven fabric of Example 1. The furnace is described in Circuits Manufacturing, October 1975. The furnace differs from the spray pyrolysis system of Example 19 by the continuous nature of the furnace and the use of vapor deposition of reactants. The furnace temperature could be profiled to reach approximately 560° C. and has been used to produce tin dioxide coated flat glass in one pass. The CVD furnace used tetramethyl tin, or stannic chloride as the vaporous tin source. The fluoride dopant source used with tetramethyl tin was trifluoro- bromo methane and with stannic chloride was hydro- fluoric acid. The oxidant in the CVD furnace was a combination of water (vapor) and methanal. The non-woven mat used to evaluate the state of the art process equipment, was the same non-woven mat used in Examples 1 and 18. The process was evaluated using the highest temperature attainable in the oven using the slowest belt speed and at conditions to maximize reactant deposition and formation of a fluoride doped tin dioxide. A series of 25 process runs were made in the furnace and it was determined that essentially no deposition and coating was obtained on the non-woven mat. The same conditions with flat glass produced highly conductive tin dioxide coatings on soda lime glass.

EXAMPLE 22

An electrolysis tin oxide deposition method that had been used experimentally on flat surfaces was evaluated for coating non-woven mat of the type set forth in examples 1, 20 and 21. The method was based on the controlled homogenous precipitation of tin hydrate hydroxide from an aqueous solution of stannic chloride complexed with ammonium chloride. In the method, a catalyst (silver nitrate) is added in order to initiate precipitation. Precipitation begins when the substrate is immersed and the pH is brought up to 7.5 with sodium hydroxide. The results obtained when a non-woven fabric was utilized in the process were very low deposition rates, poor materials utilization, poor coating adhesion, poor fiber coating, i.e., clumps, poor continuity of the fiber, very low to zero dopant incorporation and a very high resistivity tin oxide.

The results set forth in examples 20, 21 and 22 demonstrate the difficult and substantial problems associated with the coating of shielded surfaces and/or 3-D type substrates. In examples 20 and 21, the substitution of a 3-dimensional, non-woven fabric for a flat glass substrate in units which are used to effectively coat flat glass were unsuccessful in their application to a 3-dimensional substrates and/or substrates with shielded surfaces. In addition, example 22 demonstrates the difficulty in processing 3-D substrates, i.e., very high resistivity and in addition, the difficult problem of incorporation of a dopant to provide enhanced electrical conductivity. A comparison between example 1 and examples 20, 21 and 22 demonstrate the unexpected, unique advantages and advances of the processes of this invention and the unique products for use in a wide variety of applications.

While this invention has been described with respect to various specific examples and embodiments, it is to be understood that the invention is not limited thereto and that it can be variously practiced within the scope of the following claims.

What is claimed is:

1. An article comprising a three dimensional inorganic, porous substrate other than electrically conductive tin oxide having an outer surface area and an internal pore surface area and having a coating containing electrically conductive tin oxide on at least a majority portion of the outer surface area of all three dimensions thereof and a limited coating of at least about 10 percent non coated internal pore surface area of said substrate, said porous substrate having a total surface area of from about 0.01 to about 700 m$^2$/gram.

2. The article of claim 1 wherein the substrate is selected from the group consisting of silicon carbide and an inorganic oxide.

3. The article of claim 2 wherein the substrate is an inorganic oxide.

4. The article of claim 3 wherein said coating includes an effective amount of a dopant.

5. The article of claim 4 wherein the dopant is fluoride.

6. The article of claim 1 wherein said coating has a thickness in the range of from about 0.1 micron to about 10 microns.

7. The article of claim 1 which further comprises an organic polymeric matrix material in contact with said coated substrate.

8. The article of claim 3 wherein the inorganic oxide is selected from the group consisting of alumina, silica, zirconia, titania, silica alumina, a zeolite, boria, zeolite modified inorganic oxide, alumina phosphorus oxide, zirconium silicate, magnesia, a perovskite, a spinel, an aluminate and mixtures thereof.

9. The article of claim 4 wherein the inorganic oxide is selected from the group consisting of alumina, silica, silica alumina, zeolite modified inorganic oxide, titania, and mixtures thereof.

10. The article of claim 5 wherein the inorganic oxide is selected from the group consisting of alumina, silica, silica alumina, zeolite modified inorganic oxide, titania and mixtures thereof.

11. The article of claim 1 wherein the coating containing tin oxide is on at least about 70% of the outer surface of all three dimensions thereof and at least about 10% of the internal pore surfaces are non-coated.

12. The article of claim 1 wherein the pore substrate has a bulk density of from about 10% to about 70%.

13. The article of claim 4 wherein the pore substrate has a bulk density of from about 10% to about 70%.

14. The article of claim 9 wherein the pore substrate has a bulk density of from about 10% to about 70%.

15. The article of claim 7 wherein the polymeric matrix material is selected from the group consisting of a polyolefin, a polyvinyl polymer, an epoxy-based polymer, a phenol-formaldehyde polymer, a polyester, a polyvinyl ester, a polyurethane and mixtures thereof.

16. The article of claim 1 which further comprises a lead oxide positive active electrode material in contact with said coated substrate and said porous substrate is an acid resistant particle.

17. The article of claim 1 wherein the surface area of the porous substrate is from about 10 to about 600 m²/gram, and said porous substrate has a porosity having at least one of the following physical properties: a bulk density of from about 10% to about 70% or a pore volume of from about 0.4 cc/gram to about 3.5 cc/gram.

18. The article of claim 1 wherein the porous substrate is a particle selected from the group consisting of a pellet, an extrudate, a bead, a flake, an aggregate, a ring, a saddle, and a star.

19. The article of claim 8 wherein the porous substrate is a particle selected from the group consisting of a pellet, an extrudate, a bead, a flake, an aggregate, a ring, a saddle, and a star.

20. The article of claim 1 which further comprises a catalyst material associated with said porous substrate.

21. The article of claim 8 which further comprises a catalyst material associated with said porous substrate.

22. The article of claim 18 which further comprises a catalyst material associated with said porous substrate and the coating containing tin oxide is on at least about 70% of the outer surface of all three dimensions thereof and at least about 10% of the internal pore surfaces are non coated.

23. The article of claim 21 wherein said catalyst material includes at least one metal selected from the group consisting of gold, silver, copper, vanadium, chromium, tungsten, zinc, indium, antimony, a platinum group metal, iron, nickel, manganese, cesium, and titanium.

24. The article of claim 23 wherein said coating includes an effective amount of a dopant and the dopant is fluoride.

* * * * *